(12) United States Patent
Fenty, III et al.

(10) Patent No.: US 10,204,251 B1
(45) Date of Patent: Feb. 12, 2019

(54) NETWORK BASED VENDOR-MANAGED INVENTORY SYSTEM AND METHOD

(71) Applicant: MSC Services Corp., Melville, NY (US)

(72) Inventors: William Patrick Fenty, III, Dix Hills, NY (US); Charles Bonomo, Westhampton Beach, NY (US); Joseph Patrick Lo Faso, Davidson, NC (US); Alan P. Yang, Saint James, NY (US)

(73) Assignee: MSC Services Corp., Melville, NY (US)

( * ) Notice: Subject to any disclaimer, the term of this patent is extended or adjusted under 35 U.S.C. 154(b) by 0 days.

(21) Appl. No.: 15/793,058

(22) Filed: Oct. 25, 2017

(51) Int. Cl.
*G06F 19/00* (2018.01)
*G06K 7/10* (2006.01)
*G06K 7/14* (2006.01)
*G06Q 30/06* (2012.01)

(52) U.S. Cl.
CPC .......... *G06K 7/109* (2013.01); *G06K 7/1434* (2013.01); *G06Q 30/0621* (2013.01); *G06Q 30/0635* (2013.01)

(58) Field of Classification Search
CPC .... G06Q 10/08; G06Q 10/087; G06Q 20/208; G06Q 20/20; G06Q 30/06; G06Q 30/0633; G06Q 30/0635
See application file for complete search history.

(56) References Cited

U.S. PATENT DOCUMENTS

| | | | | |
|---|---|---|---|---|
| 9,053,452 B2* | 6/2015 | Bonomo | ............... | G06Q 10/087 |
| 2001/0037259 A1* | 11/2001 | Sharma | ................... | G06Q 10/08 |
| | | | | 705/23 |
| 2018/0047010 A1* | 2/2018 | Itwaru | .................... | G06Q 20/02 |

* cited by examiner

*Primary Examiner* — Steven S Paik
*Assistant Examiner* — April Taylor
(74) *Attorney, Agent, or Firm* — Patent Technologies, LLC; Robert D. Gunderman, Jr.

(57) ABSTRACT

A network based system and method for managing inventory is disclosed. A smartphone device is connected to a portable barcode scanner using a communication connection. A scanner adapter application on the smartphone device receives output date comprising order data, and parses the order data, passing it to an upload application. The smartphone device further comprises an order management application to take order data from the scanner adapter application and smartphone user data entry to access a backend server system to retrieve and collect detailed order data in support of order submission. The detailed order data contains data elements necessary for completion and submission of orders. An API configured to receive the at least part of the order data from the upload application processes the order information into an electronic order, and sends the electronic order to a vendor server.

25 Claims, 30 Drawing Sheets

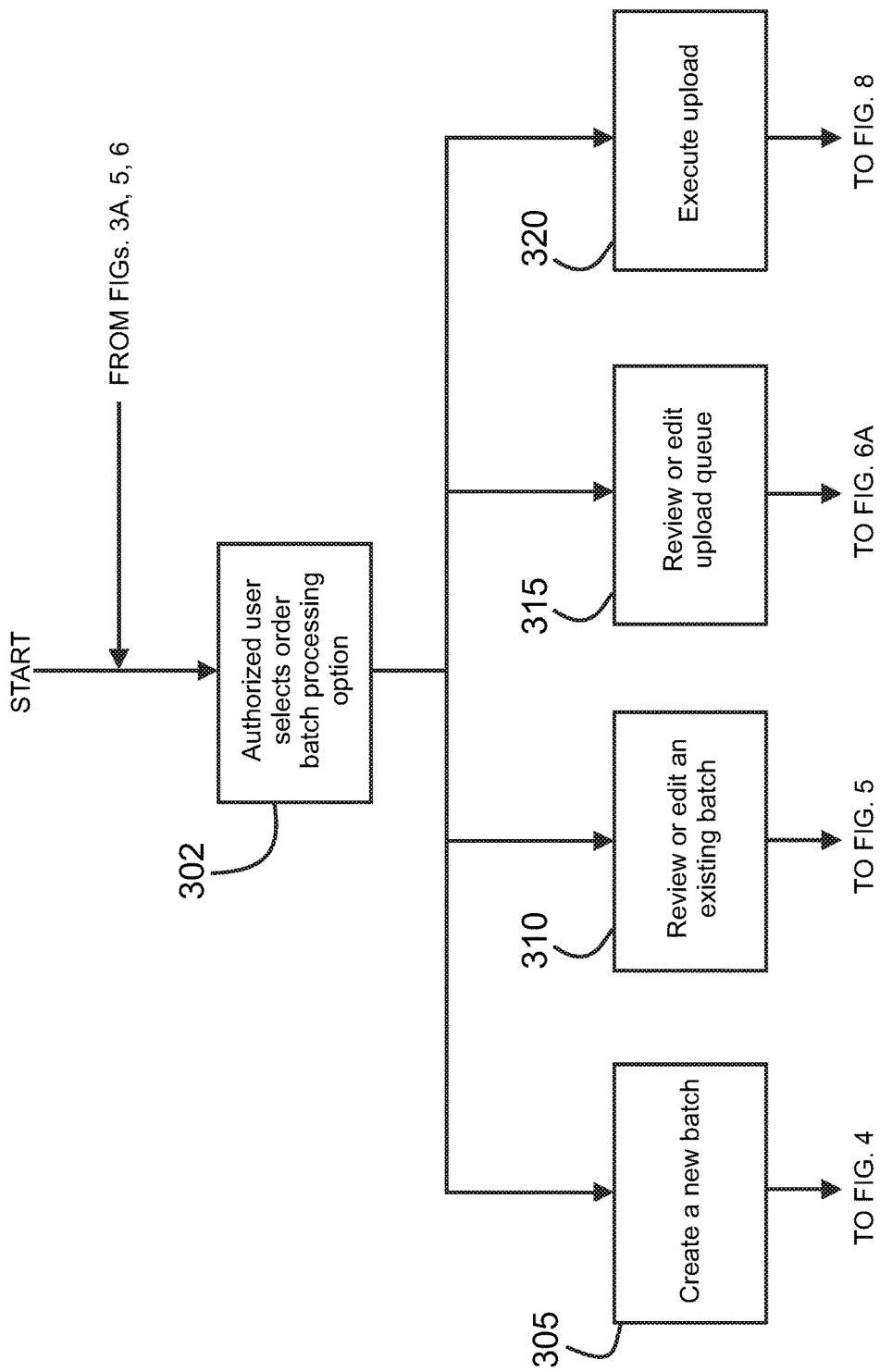

NETWORK BASED VENDOR-MANAGED INVENTORY SYSTEM AND METHOD

BACKGROUND OF THE INVENTION

1. Field of the Invention

The present invention relates generally to resource requirements planning, and more particularly, to a network based system and method for managing inventory.

2. Description of Related Art

Many businesses maintain regular stocks of consumable supplies. For example, businesses involved in mechanical manufacturing and repair may require consumable stocks of mechanical fasteners, tools and other implements, such as screws, nuts, drill bits, sockets and other related items. These supplies may be stocked in supply bins, and must be reordered periodically as the supplies are utilized in the normal course of business. Monitoring the stock of supplies is often tedious, especially for large and/or diverse stocks of supplies. For example, a supply officer would need to peruse the entire stock collection, identify which stocks are running low, record the information, contact multiple vendors, cross reference to obtain the best price on each stock item, and then place one or more orders to ensure the business is obtaining the best price overall during restocking. This process may become very inefficient when a supply officer is tasked with maintaining a stock of hundreds of diverse supply items, which are used at widely varying frequencies, and which are each sold by a dozen or more vendors.

Creating a computer-aided process that utilizes a barcode scanner for supply cataloguing and ordering would therefore be highly advantageous. However, this solution may be frustrated by the fact that customers may be reluctant to allow installation of third party software suites on their computer systems, which are often the sole reliable access to the Internet available on-site at a customer location, and that customers may not have the resources to administer the process. Therefore, while vendor agents or authorized users of vendor-issued inventory cataloguing systems may be allowed to visit the customer's facility to assess the customer's current stock of supplies, and the vendor agents or users have a reliable data connection with which to upload the information to the vendor, the information to be uploaded may be in need of validation from external data sources. Such validation includes quantity availability, detail on model and part numbers, searches for supply specifics, and general part or component information. The vendor agents or users would benefit from immediate access to supply information stored on a vendor or other backend server in order to perform validation and close customer orders in a timely fashion.

The information needed to perform such validations, coupled with access to a backend server, would offer the vendor agent or user on-the-spot access to sales metrics, account detail information, order history, product detail, and special support functions.

BRIEF SUMMARY OF THE INVENTION

In one aspect of this disclosure, a system for ordering of supplies is disclosed. The system includes a portable barcode scanner configured to output data according to at least one of an HID, CDC, Honeywell API (for Honeywell barcode scanners) or SPP protocol, the output data reflecting results of scanning a barcode. The system also includes a smartphone device, physically removed from the portable barcode scanner, having an input port through which an external device can provide data to the smartphone for processing. The smartphone device is incapable of recognizing and parsing data, received via the input port, when the data is configured according to the, Honeywell API, CDC or SPP protocol. The system further includes a communication connection connecting the smartphone device and the portable barcode scanner to each other via the input port. The system further includes a communication connection connecting the smartphone device and a backend server system via the Internet.

A scanner adapter application, operating on the smartphone device, receives the output data from the portable barcode scanner via the input port, the output data comprising order data relating to a supply item stocked in a bin and configured according to one of the HID, CDC, Honeywell API or SPP protocols.

An order-management application, operating on the smartphone device, uses the order data from the scanner adapter application to access the backend server system to retrieve and collect detailed order data in support of order submission. Such detailed order data includes item detail, customer detail, vendor suppliers, quantities available and other data elements necessary for completion and submission of orders.

The order-management application is configured to parse the order data and pass the order data to an upload application operating on the smartphone device, the upload application having a current data field that receives at least part of the order data. The system additionally includes a backend server configured to search, retrieve and return detailed order data to the order-management application, and an API to receive order information including the at least part of the order data, from the upload application on the smartphone device, process the received order information into an electronic order, and send the electronic order to a vendor server. The system further includes an API interface through which the smartphone device can connect to the backend servers via one or more networks.

In another aspect of this disclosure, a system for ordering of supplies is disclosed. The system includes a portable barcode scanner configured to output data, the output data reflecting results of scanning a barcode. A smartphone device, physically removed from the portable barcode scanner, includes an input port through which an external device can provide data to the smartphone for processing, the smartphone device being incapable of recognizing and parsing data received via the input port. A communication connection connects the smartphone device and the portable barcode scanner to each other via the input port. A scanner adapter application, operating on the smartphone device, receives the output data from the portable barcode scanner via the input port, the output data comprising order data relating to a supply item stocked in a bin.

An order-management application, operating on the smartphone device, uses the order data from the scanner adapter application and smartphone user data entry to access the backend server system to retrieve and collect detailed order data in support of order submission. Such detailed order data includes item detail, customer detail, vendor suppliers, quantities available, and other data elements necessary for completion and submission of orders.

The order-management application is configured to parse the order data and pass the order data to an upload application operating on the smartphone device. The upload application includes a current data field that receives at least part of the order data. The upload application being further configured to upload order information through an API, via a network, the order information including the at least part of the order data via an interface of the smartphone device.

In another aspect of this disclosure, a computer-implemented method for ordering of supplies is disclosed. The method includes scanning, using a portable scanner, at least one item barcode on a bin, the item barcode being associated with a supply item stocked within the bin. Order information data is transmitted from the portable scanner to a smartphone device remotely located from the scanner, the order information data being configured according to an HID, CDC, Honeywell API or SPP protocol and corresponding to the item barcode. The order information is received from the portable scanner in an order-management application operating on the smartphone device. The system additionally includes a backend server configured to: 1) retrieve and return detailed order data to the order-management application, and 2) receive order information including the at least part of the order data, from the upload application on the smartphone device, process the received order information into an electronic order, and send the electronic order to a vendor server. The order-management application parses the order information data and transfers the order information data into a data field of an upload application operating on the smartphone device. The order information data is transmitted using the upload application. The received order information is processed, using the API, into an electronic order, which is transmitted to a vendor server.

In another aspect of this disclosure, a computer-implemented method for retrieving and displaying information of use to the sales associate (user), including sales metrics, account detail, order history, and product detail information, is disclosed. The method includes entering on the smartphone device a request for the specific type of information to a data-retrieval and display application operating on the smartphone device. The system additionally includes a backend server configured to retrieve and return the requested detailed information to the retrieval and display application. The retrieval and display application parses the request, and sends the request data to the backend server. The backend server parses the request data, processes the request, and returns the response to the smartphone device. The retrieval and display application then displays the response to the user.

In another aspect of this disclosure, a computer-implemented method for submitting special processing requests from the sales associate (user), including the printing of barcodes at a branch office, requests for a special sales quote or a price change to a back-office associate, and requests for generating a customer usage report to show ordering trends, is disclosed. The method includes entering on the smartphone device a request for the specific process to a process-request application operating on the smartphone device. The system additionally includes a backend server configured to perform the requested process and return a confirmation to the process-request application.

The foregoing has been provided by way of introduction, and is not intended to limit the scope of the invention as described by this specification, claims and the attached drawings.

BRIEF DESCRIPTION OF THE DRAWINGS

This disclosure is further described in the detailed description that follows, with reference to the drawings, in which:

FIG. 3 is an example sequence of steps for implementing the supply ordering system;

Figure 1:
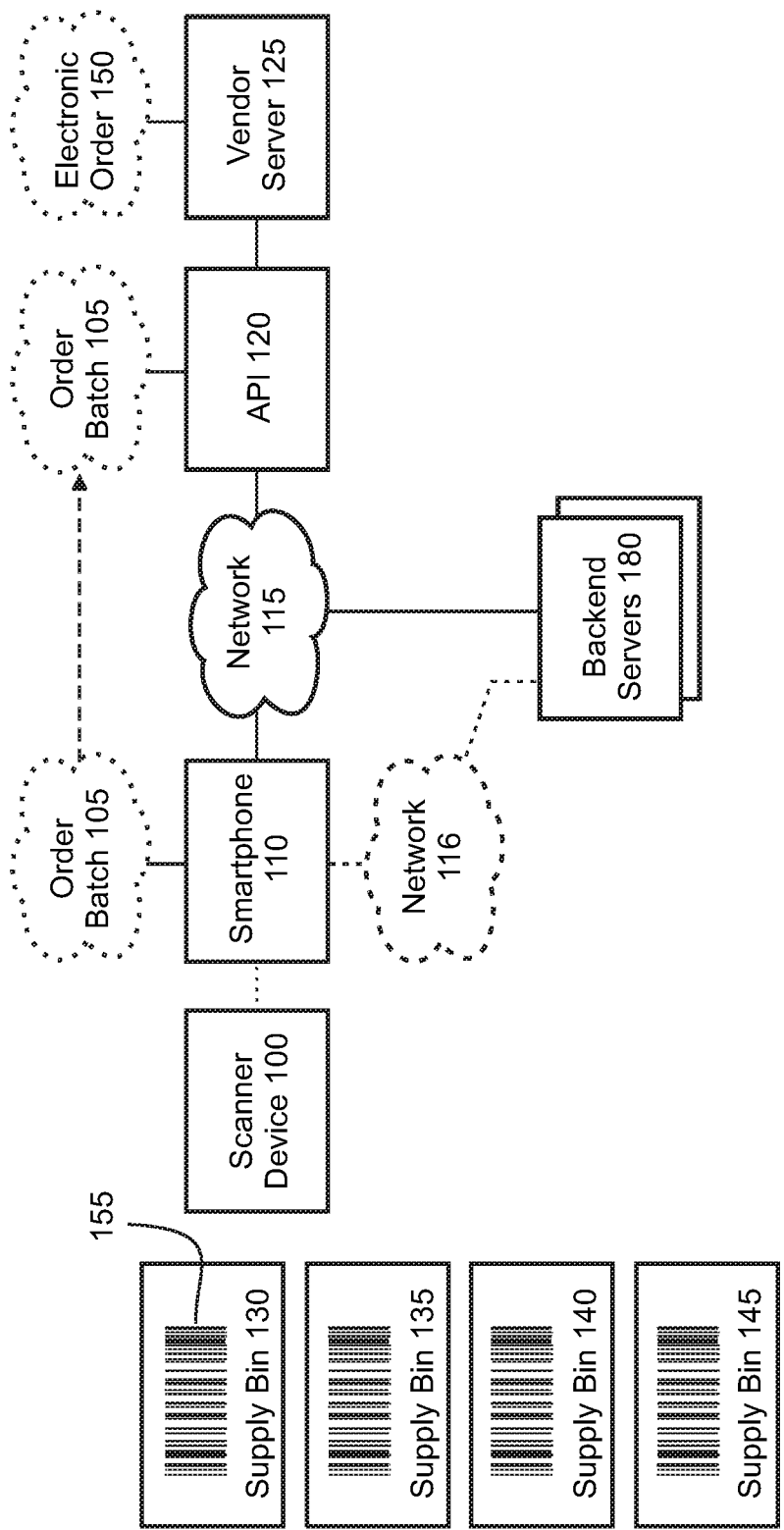
FIG. 1 is a high level representation of the operation of a supply ordering system as described herein.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, claims and drawings attached hereto.

DESCRIPTION OF THE PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

For a general understanding of the present invention, reference is made to the drawings. In the drawings, like reference numerals have been used throughout to designate identical elements.

The present application discloses an enhanced supply ordering system and method. The disclosed supply ordering system and method greatly streamlines the process of maintaining supply stocks using a combination of electronic barcode labeling, barcode scanners, smartphone applications ("apps"), and computer control, coupled with access to backend systems to provide real-time order status, customer account search, product cross-reference search, online order validation and submission, RFQ building and submission, label ordering, and other functions enabled by said backend system access. All of these functions are accessed by the user via a dedicated app on the smartphone device. As provided herein, various software components and applications are described. It is given that these various software components, applications, programs, code, routines, and the like reside on computer readable media, a network, a computer, a processor, memory, servers, computers, personal computers, hand-held devices, smart phones, and the like, regardless of the description that may be provided that may in some instances omit a specific reference or description of the requisite hardware in the interest of brevity and succinctness of the description provided.

The user, also referred to as the "service provider", has no requirement to know exact customer IDs or account numbers, item numbers, or supplier IDs. The dedicated application, also referred to herein as the "order-management application", uses conventional search engines to search one or more supplier or customer account lists (text names, with autocorrection) that turns up account info (address, contact, current order data and status) using access to a backend database server. With respect to items, the order-management application likewise uses conventional search engines to search one or more inventories by item name or number to obtain item characteristics, quantities available, package quantities, prices, and descriptions. All unresolved item entries made by the service provider are validated by the order-management application.

All backend database server data reflect current status of data in real time. The user may submit orders directly to suppliers without further intervention or delay, meeting urgent needs of customers. Backend database server availability facilitates user dialog with customers for determining and responding to new item requirements. Suppliers may include those of the user's business entity or others as required for the order.

Said backend database server may be owned by the user's business entity, keeping app and data more secure, or it may be owned by a supplier, offering broader access to items and item availability. In a multiple-backend-server embodiment, servers belonging to the user's business entity and servers owned by suppliers and other entities are used, in order to offer the user (sales associate) the maximum access to items and item ordering information. The user exploiting broader access to items and item availability may add items to an order seamlessly and without interruption or intervention. The order-management application displays a plus-sign button to provide immediate item availability display to the user, on demand.

The order-management application offers price change capability with pricing through office support for special orders and price quotes. The order-management app provides for insertion of images in price quotes to facilitate mutual agreement on item selection.

The order-management application offers an option for ordering item labels, and an option for suspending and releasing orders if review is required prior to order submission.

In a customer-user embodiment, the order-management application offers an advantaged customer direct access to the functions and data specific to and limited to that customer's particular needs, streamlining the order process while keeping the advantaged customer within the clientele of the owner of the present system.

The search features of the order-management application are transparently extendable, as search technologies develop and find use in the databases used by the application. One such extension expected is the ability to search for items possessing properties similar to those outlined during an ordering process.

FIG. 1 is a high level overview of an exemplary supply ordering system. Each supply bin 130-145 may be labeled with a barcode 155, which contains information preferably identifying at least the supply stocked in the bin. In some embodiments, the re-order quantity for the supply item, the minimum/maximum inventory level for the item, and other item parameters may be either contained in the barcode or contained in an outside source and mapped or otherwise related to the barcode itself. A portable barcode scanner device 100, which may be configured to output information according to the Human Interface Device ("HID"), communication Device Class ("CDC") protocol, Honeywell API or Serial Port Profile ("SPP") is operatively connected to a smartphone device 110 by direct physical connection, such as a universal serial bus ("USB") connection or using some other method of wirelessly transferring data according to, for example, short-range wireless communication standard protocol (such as a Bluetooth device) between the smartphone device 110 and the portable scanner device 100. The scanner device 100 is used to scan the barcodes 155 to reorder that item. An order batch 105 is prepared on the smartphone device 110. Once the barcode 155 has been scanned, the order batch 105 is created by pulling data from a backend server 180 that contains information such as price, availability and the like; thus allowing a user to create an order. The smartphone device 110 requests such data from the backend server 180, and the backend server 180 in turn sends this data back to the smartphone device 110 where the smartphone device 110 prepares the order and sends it back to the backend server 180 or to another server for further processing.

When supplies are needed, a user scans the relevant barcodes 155 for the desired supply items with the portable scanner device 100, adding the scanned supply items to the order batch 105. Order batch 105 contains item details and quantities ordered, prices and order cost breakout and totals, supplier identities, delivery details, and shipping and billing information, all searched, selected, and entered by the user from backend servers 180 via network 115 or optionally a second network 116.

One or more software applications are installed on the smartphone device 110 to (i) receive the HID, CDC, Honeywell API or SPP information from the scanner 100 and parse it into a format usable by one or more relevant applications on the smartphone 110 to thereby facilitate communication between the two devices, and (ii) to coordinate external transmission of the order batch information 105.

The Smartphone device 110 may take the form of, for example, a personal data assistant ("PDA") with internet connectivity, a smartphone, such as an iPhone, Android or similar devices. In addition to smartphone devices, tablet devices, such as Android-platform tablets or the iPads may be utilized. Once a connection has been established, an upload software application 220 installed on the smartphone device 110 coordinates the upload of information from the smartphone device 100 by way of an API 120. For example, the software program may be installed on the smartphone as a smartphone "app." Subsequently, the smartphone device 110 transmits the order batch 105 through network 115 by way of an API 120. Finally, the API 120 converts the order batch 105 into an electronic order 150 and forwards the electronic order 150 to the primary vendor server 125. For example, the API 120 may open an electronic "shopping cart" on the vendor's website, and stock it with the desired supply items as indicated from the order batch 105. The API (Application Programming Interface) is further described herein, and is depicted in the drawings as a component of the present invention.

Figure 2:
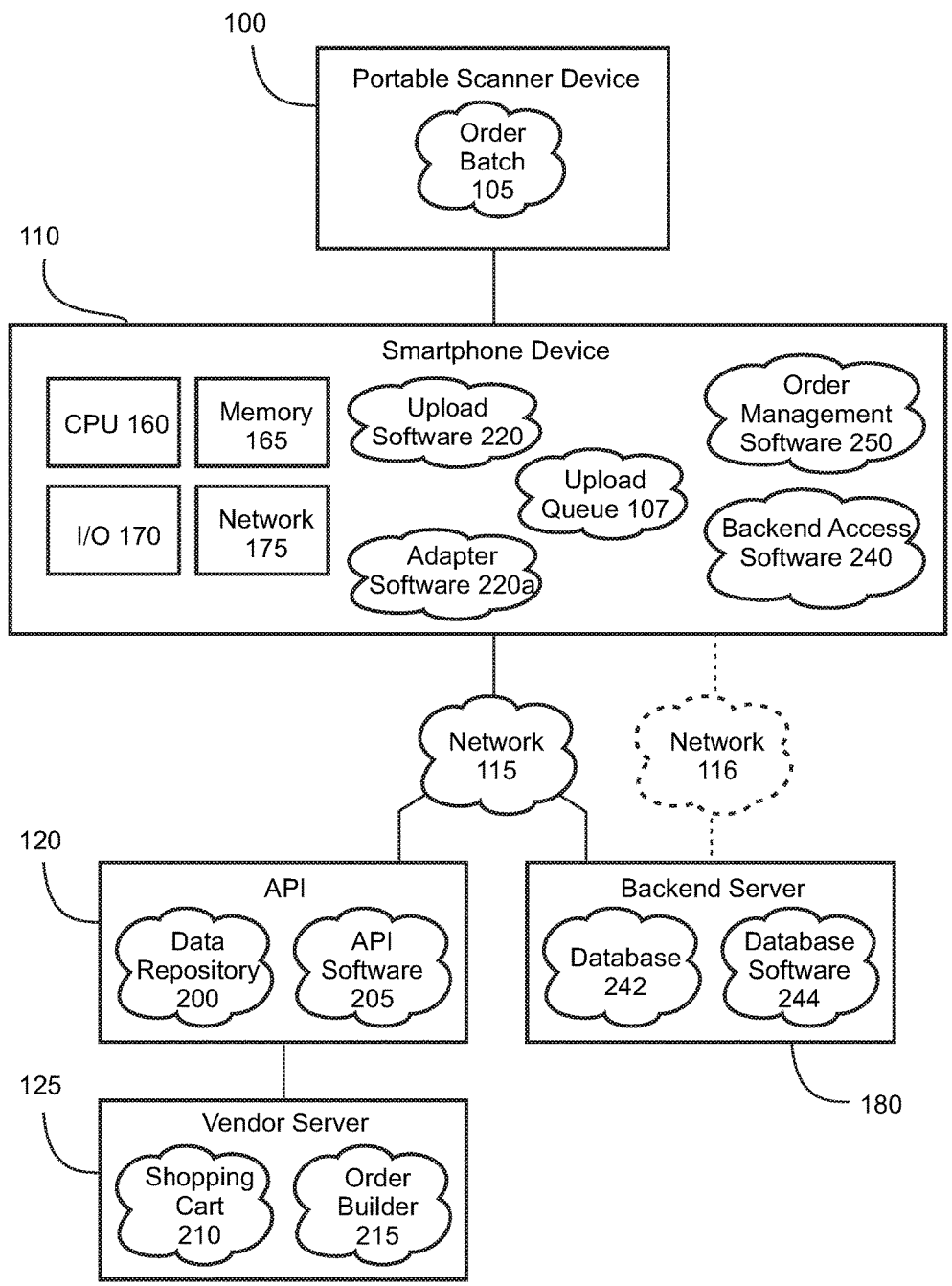
FIG. 2 is a high-level representation of the supply ordering system as described herein.

FIG. 2 is a high-level representation of the supply ordering system. The portable scanner device 100 may be implemented using a commercially available scanning device configured to output information according to the Human Interface Device ("HID"), communication Device Class ("CDC"), Honeywell API or Serial Port Profile ("SPP") protocol, such as a stand-alone barcode scanner, a barcode scanner attachment for an existing device or an application that allows another device to scan barcodes. For example, a barcode scanner that is communicatively coupled (either physically or wirelessly) to a cell phone or smartphone may be used to implement the portable scanner device 100. Alternatively, an application that allows a smartphone to scan barcodes using a built-in camera may be used as well. The portable scanner device 100 is preferably low cost, capable of reading common barcodes, compact, and shock-resistant. The portable scanner device 100 may communicate with the smartphone device 110 via an input port, which may take the form of a wireless connection, such as Bluetooth, or a detachable connection, such as a universal serial bus ("USB") cable, or direct physical coupling with the smartphone device 110. Sufficient memory may be provided to the smartphone device 110 to store a large number of batches and scanned barcodes, in accordance with the needs of the user. Data encryption may also be desirable if some measure of data security is desired. As described above, order batches 105 may be stored within the smartphone device 110. Each order batch 105 is a data structure containing scanned barcodes (desired supply items for purchase) for a single self-contained purchasing order.

The supply ordering system may be implemented with one or more smartphone devices 110 of varying configurations. In some cases, the smartphone device 110 may be of a type that is incapable of processing, recognizing or parsing data received from a device that is configured according to the Human Interface Device ("HID") communication Device Class ("CDC") protocol, Honeywell API or Serial Port Profile ("SPP"). As depicted in FIG. 2 and discussed above, smartphone device 110 may be a smartphone, such as an iPhone or an Android. Each smartphone device 110 preferably includes computing components for executing computer program instructions and processes. These components may include a processor or central processing unit (CPU) 160, memory 165, input/output (I/O) devices 170, and a network interface 175. The CPU 160 processes and executes computer program instructions. Random access memory (RAM) 165 and/or fast access cache memory preferably provides fast data supply to CPU 160. Long-term storage may be provided as a more permanent form of computer memory, and may be, for example, a hard disk, optical disk, flash memory, solid-state memory, tape, or any other type of memory. The I/O device(s) 170 permit human interaction with the computer system, such as (but not limited to) a mouse, keyboard and computer display. I/O device(s) may also include other interactive devices, such as (but not limited to) touch screens, digital stylus, voice input/output, etc. The network interface device 175 may provide the smartphone device 110 with access to a network, which may be a cellular, wireless ("wifi") or wired connection. The network 115 may be, for example, the Internet, a cellular network, a corporate intranet, or any other computer network through which the computing system may connect to or otherwise communicate with other computers and databases.

Software process or processes and executables may be used to provide human interfaces (such as a graphical user interface) and to store and initiate computer program instructions used to process and analyze data. Computer program code for carrying out operations described herein may be written in any combination of one or more programming languages, including an object oriented programming language such as Java, C++, C# or the like and conventional procedural programming languages, such as the "C" programming language or similar programming languages. The program code may execute entirely on the computing system, partly on the computing system, as a stand-alone software package, partly on the computing system and partly on a remote computer or server, or entirely on a remote computer or server.

The upload software 220 may be loaded on the smartphone device 110 as, for example, a smartphone application (such as an "app") and coordinate the upload of order batches 105 (either independently or in conjunction with API software 205) to the vendor server 125 from this central location. An adapter software application 220a may be provided on the smartphone device 110 to enable or facilitate communication between the portable scanner device 100 and the smartphone device 110. The adapter software application 220a may be a component of the upload software 220, or a separate software entity.

Backend access software 240 is provided on the smartphone device 110 to enable and facilitate communication between the smartphone device 110 and the backend server 180. Order management application software 250 is also provided on the smartphone device 110. Order management application software 250 invokes backend access software 240 to serve user search, selection, and entry of detailed order information on items, quantities, prices, suppliers, billing and shipping processes, and other information as required for completion and direct submission of orders by the smartphone user. Said orders are then submitted in one or more order batches 105. The immediate access to said detailed order information provided by order management application software 250 and backend access software 240 obviates time-consuming offline searches for information, wasteful errors in submitted orders, and labor-intensive correction of incorrect order submissions. At the same time, immediate access to said detailed order information facilitates immediate closure of accurate, complete orders for the user and the customer.

Backend access software 240 retrieves detailed order information from database 242 using database software 244 in backend server 180 via network 115 or optionally via a separate network 116. Network 116 may be, for example, the Internet, a cellular network, a corporate intranet, or any other computer network through which the computing system may connect to or otherwise communicate with other computers and databases.

Certain combinations of smartphone devices 110 and portable scanner devices 100 may be incompatible with one another. For such combinations, adapter application software 220a running on the smartphone 110 allows the pairing of an incompatible device with the scanner of the portable scanner device.

The API 120 may be configured to receive the order batch 105 uploaded by the upload application software 220 running on the smartphone device 110. Upon receiving a prompting from a smartphone device 110 (through network 115), API software 205 receives the order batch 105 from the smartphone device 110 via network 115 and stores the received order batch 105 in the data repository 200 by way of the API 120.

The API 120 preferably processes the order batch 105, generates an electronic order 150, and forwards the electronic order to at least one vendor server 125. The vendor server 125 may be, for example, a server hosting a vendor's retail website, and would therefore list the vendor's available stock, prices and have the capacity to create and maintain electronic "shopping carts" 210 for easing the online retail process. Order builder software 215 is also provided to retrieve the order batch 105 information from the data repository 200, and populate the shopping cart 210 with the supply items stored in the order batch 105.

Figure 3A:
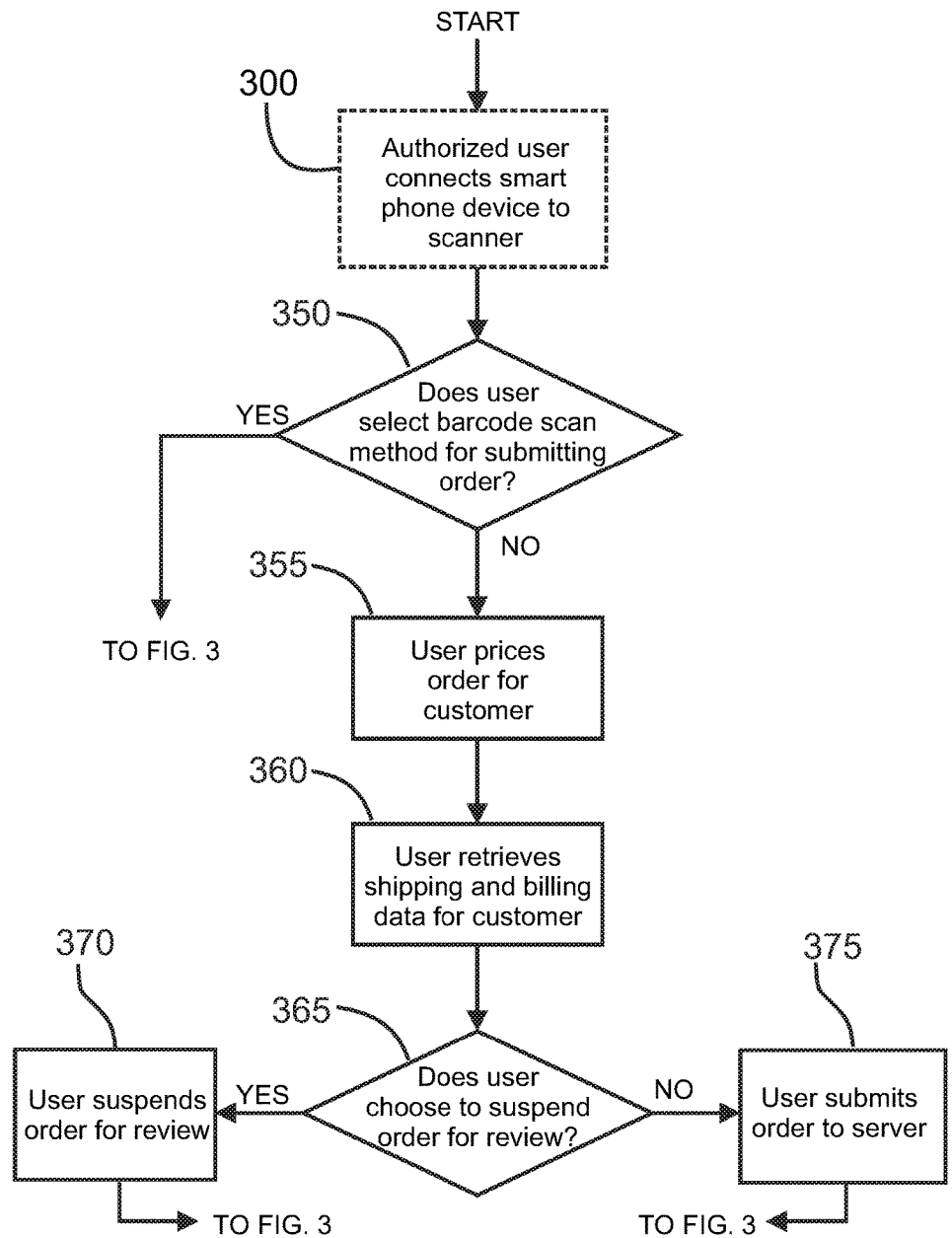
FIG. 3A is a continuing sequence of steps for implementing the supply ordering system.

FIG. 3A and FIG. 3 comprise an example sequence of steps for implementing the supply ordering system. As shown in FIG. 3A, an authorized user may optionally couple the smartphone device 110 to the portable scanner 100 (300). Although scanning is a convenience for data entry, the order-management application does not require the use of bar-code scanning for order submission, an advantage whenever scanning is not an available option. The user chooses (350) between using the conventional barcode scan method or the order-management application method for submitting a completed order. In the order-management application method, the user prices (355) the order for the customer, retrieves (360) the shipping and billing data for the customer, and chooses (365) either to suspend (370) the order for later review or submit (375) the order to the batch upload process. As shown in FIG. 3, on completion of the processes selected as shown in FIG. 3A, the user then selects (302) one of the following options as presented by upload software or app 220: create (305) a new batch of orders, review or edit (310) an existing batch of orders, review or edit (315) the batch upload queue, or execute (320) the upload of one or more batches.

Figure 4:
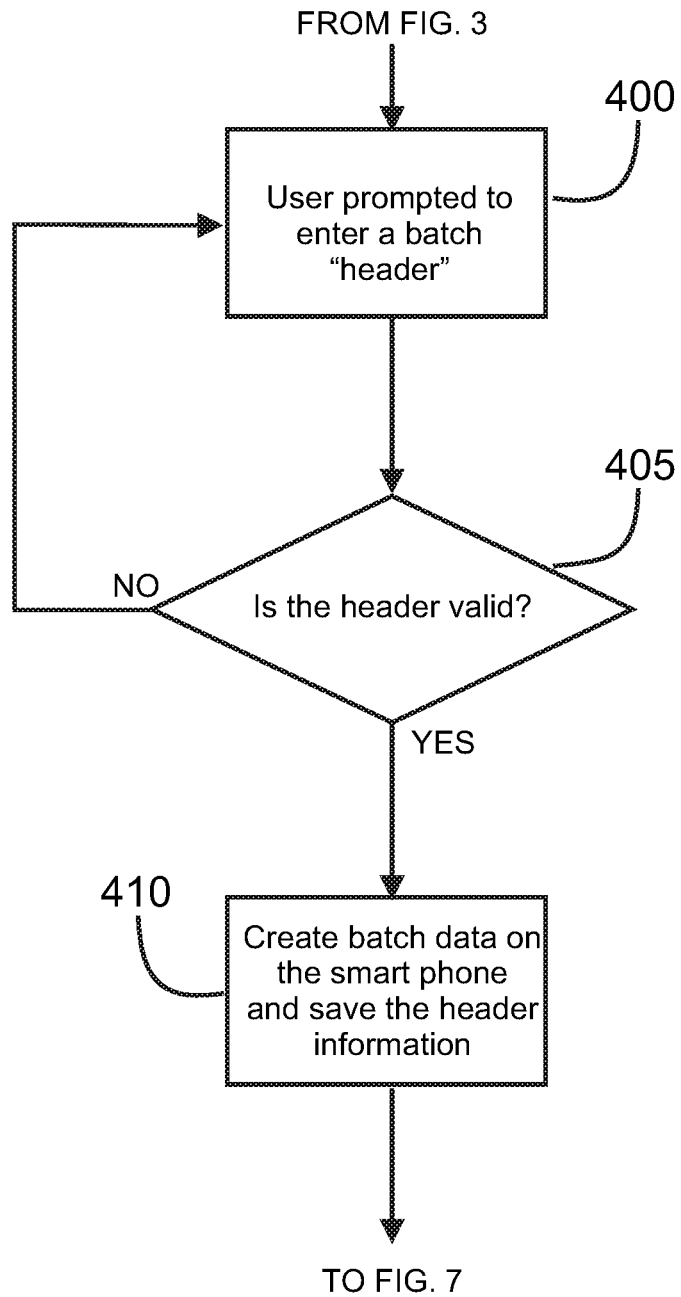
FIG. 4 is a continuing sequence of steps for implementing the supply ordering system.

FIG. 4 is a continuing sequence of steps for implementing the supply ordering system, when the user selects to create a new order batch (step 305). The user is prompted to enter a batch "header," or a general label that will uniquely identify the current batch (step 400). Once entered, the smartphone device 110 validates the header to determine whether it has already been used (step 405). If the header is not valid, the user is prompted to enter another header (step 400). If the header is valid, the batch is created on the smartphone device 110 and saved, using the header as an identifier (step 410).

Figure 7:
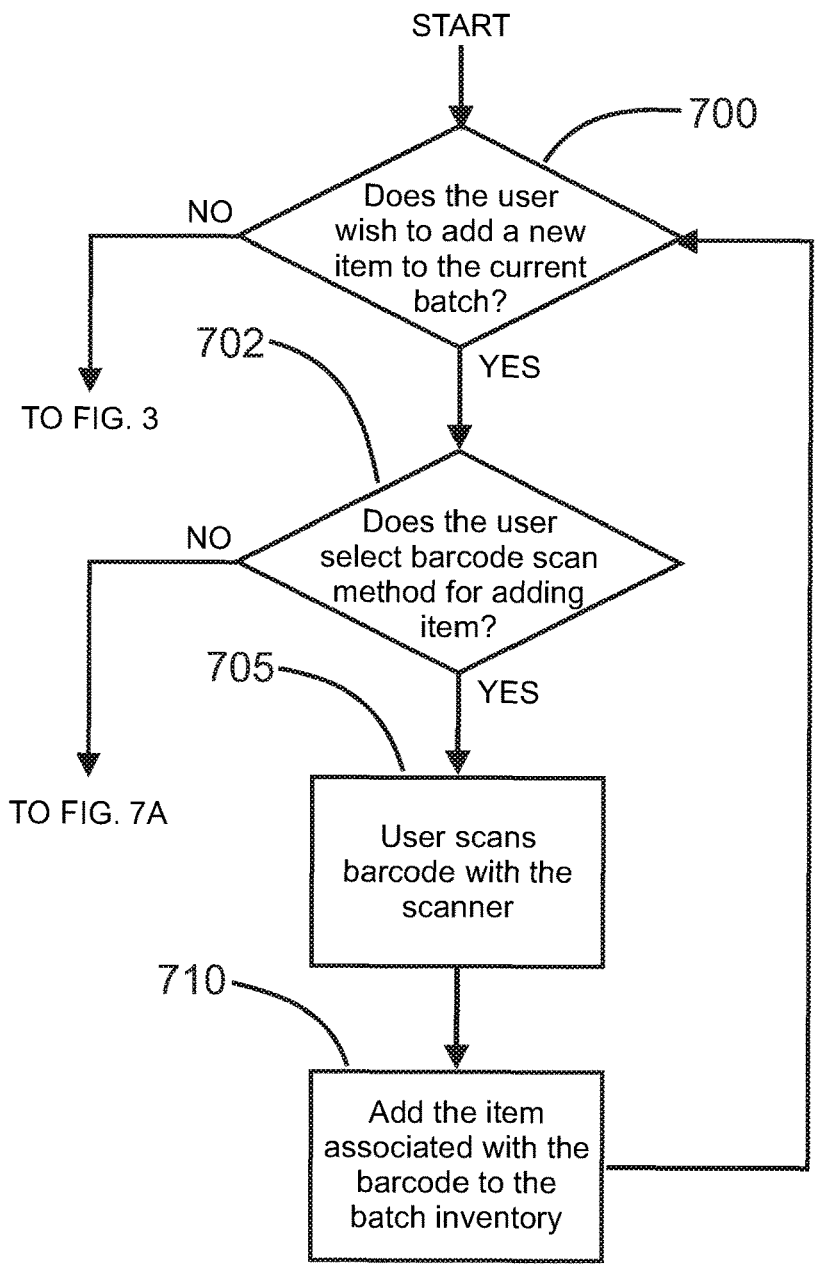
FIG. 7 is a continuing sequence of steps for implementing the supply ordering system.

The process then continues to the steps of FIG. 7.

Figure 5:
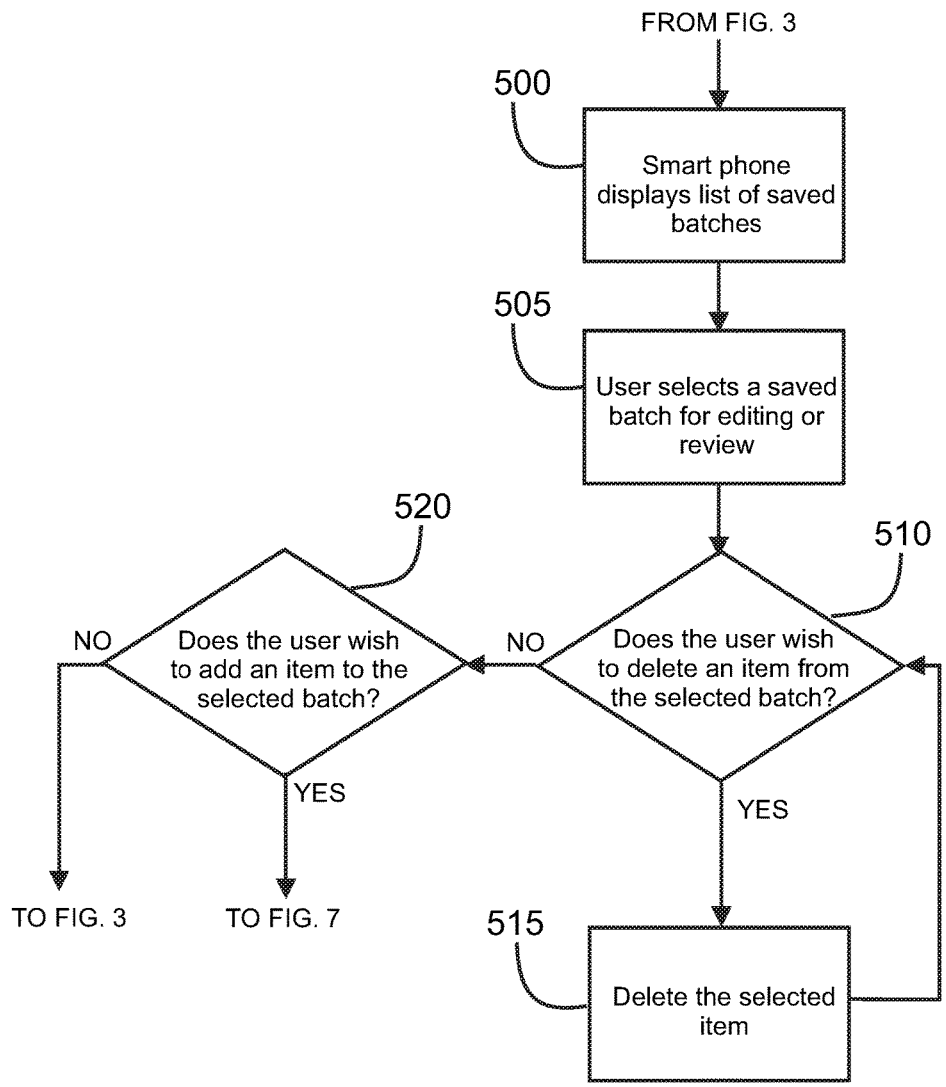
FIG. 5 is a continuing sequence of steps for implementing the supply ordering system.

FIG. 5 is a continuing sequence of steps for implementing the supply ordering system, when the user selects review or editing of an existing order batch (step 315). The smartphone device 110 displays to the user a list of saved batches (step 500). The user may then select a saved batch for review or editing (step 505). If the user desires to delete an item from a selected batch (step 510), the smartphone device 110 may await receipt of a selection of an item for deletion. Upon receiving the selection, the smartphone device 110 deletes the selected item (step 515). Similarly, if the user desires to add an item to the current batch (step 520), the process proceeds to the steps of FIG. 7. Otherwise, the process returns to the steps of FIG. 3.

Figure 6A:
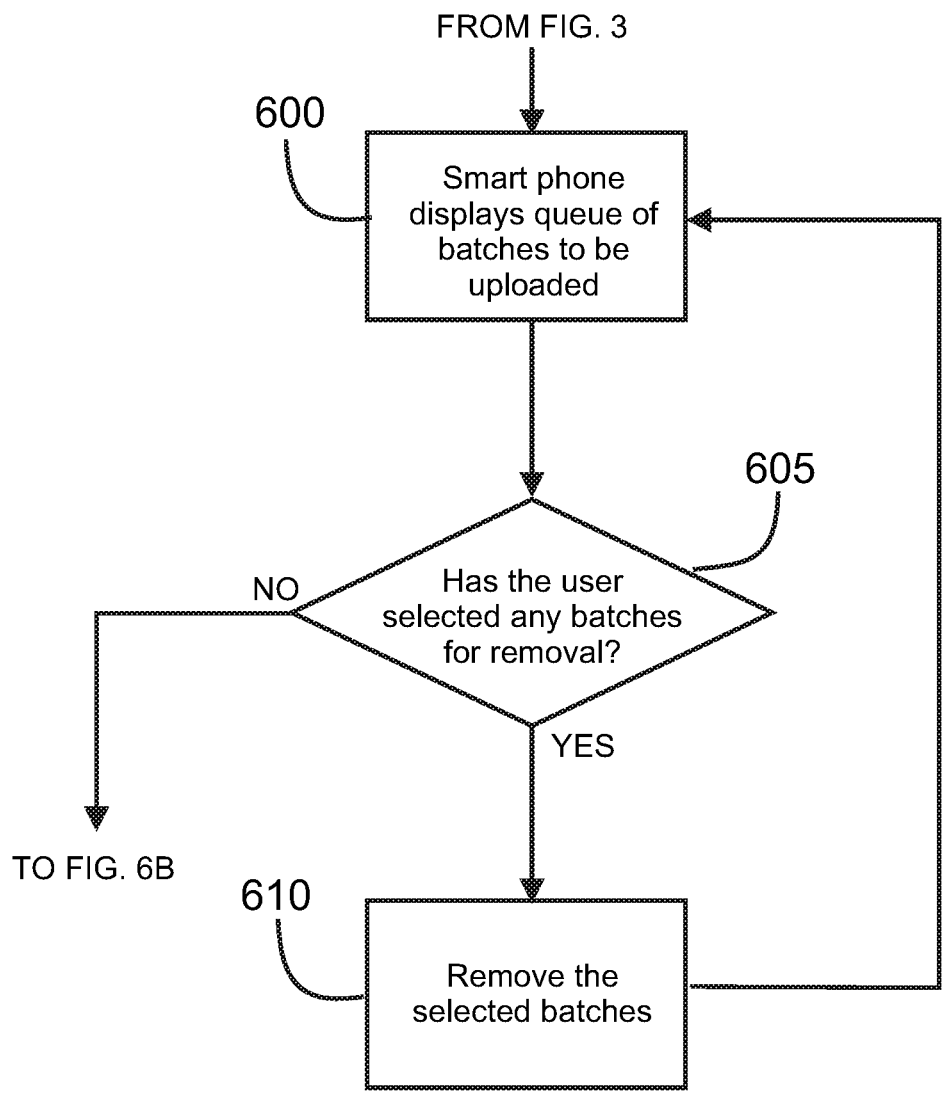
FIG. 6A is a continuing sequence of steps for implementing the supply ordering system.

FIG. 6A is a continuing sequence of steps for implementing the supply ordering system, illustrating the process when the user selects to review or edit the upload queue (step 315). The smartphone device 110 may display to the user a list of batches on the upload queue for selection (step 600). The user may be presented with the option to select a batch for removal (step 605). If the user selects one or more batches for removal (step 605), the selected batches are removed (step 610). If the user does not select a batch for removal, the process proceeds to the steps of FIG. 6B.

Figure 6B:
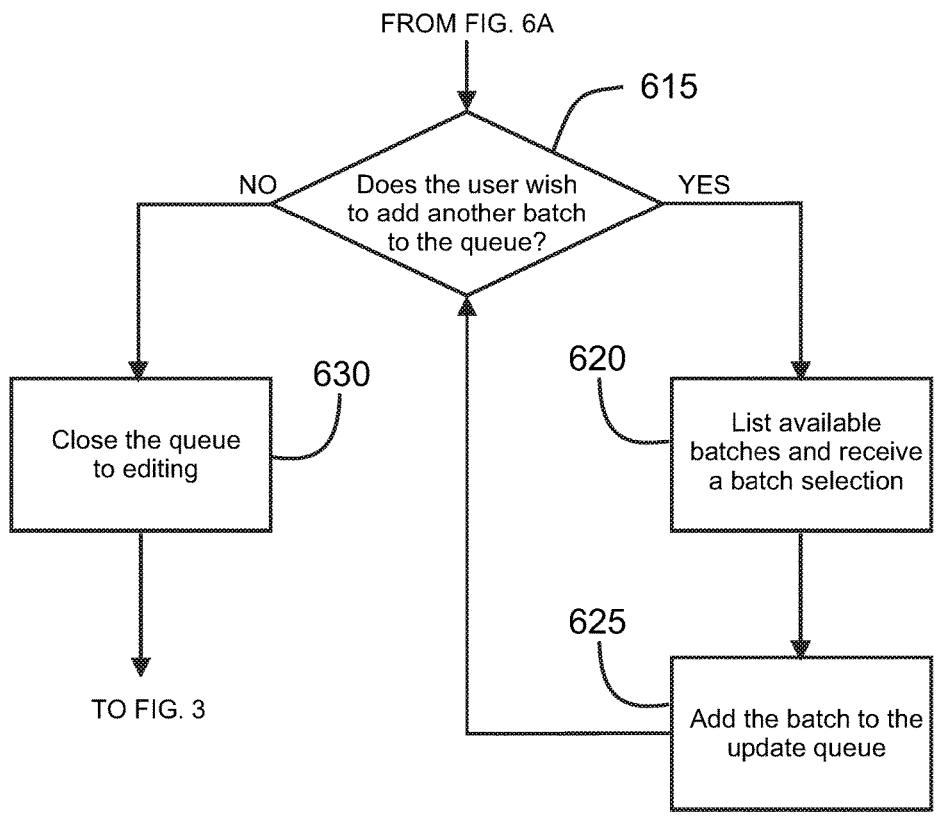
FIG. 6B is a continuing sequence of steps for implementing the supply ordering system.

FIG. 6B is a continuing sequence of steps for implementing the supply ordering system. The smartphone device 110 may allow a user to add batches to the queue as well. If a user selects to add a batch to the queue (step 615), the smartphone device 110 may display a list of available batches and receive a selection of one or more batches for addition to the queue (step 620). The selected batches are then added to the queue (step 625). If no selection is received (step 615), then the queue is closed to editing (step 630), and the process returns to the steps of FIG. 3.

FIG. 7 is a continuing sequence of steps for implementing the supply ordering system, describing the sequence of steps for adding new items to an existing batch. When a user has a batch open for editing and desires to add an item to the current batch (step 700), one of two processes may be selected. In a first simpler ordering process, given the presence of the barcodes for the items to be added, the user engages the order-management application to scan a barcode on a supply bin housing a desired supply item (step 705). The scanned item is then added to the current batch inventory (step 710).

In a second comprehensive ordering process, the user engages the order-management application to determine items to be added by searching a backend server's database to gather information necessary for selecting and ordering items.

Figure 7A:
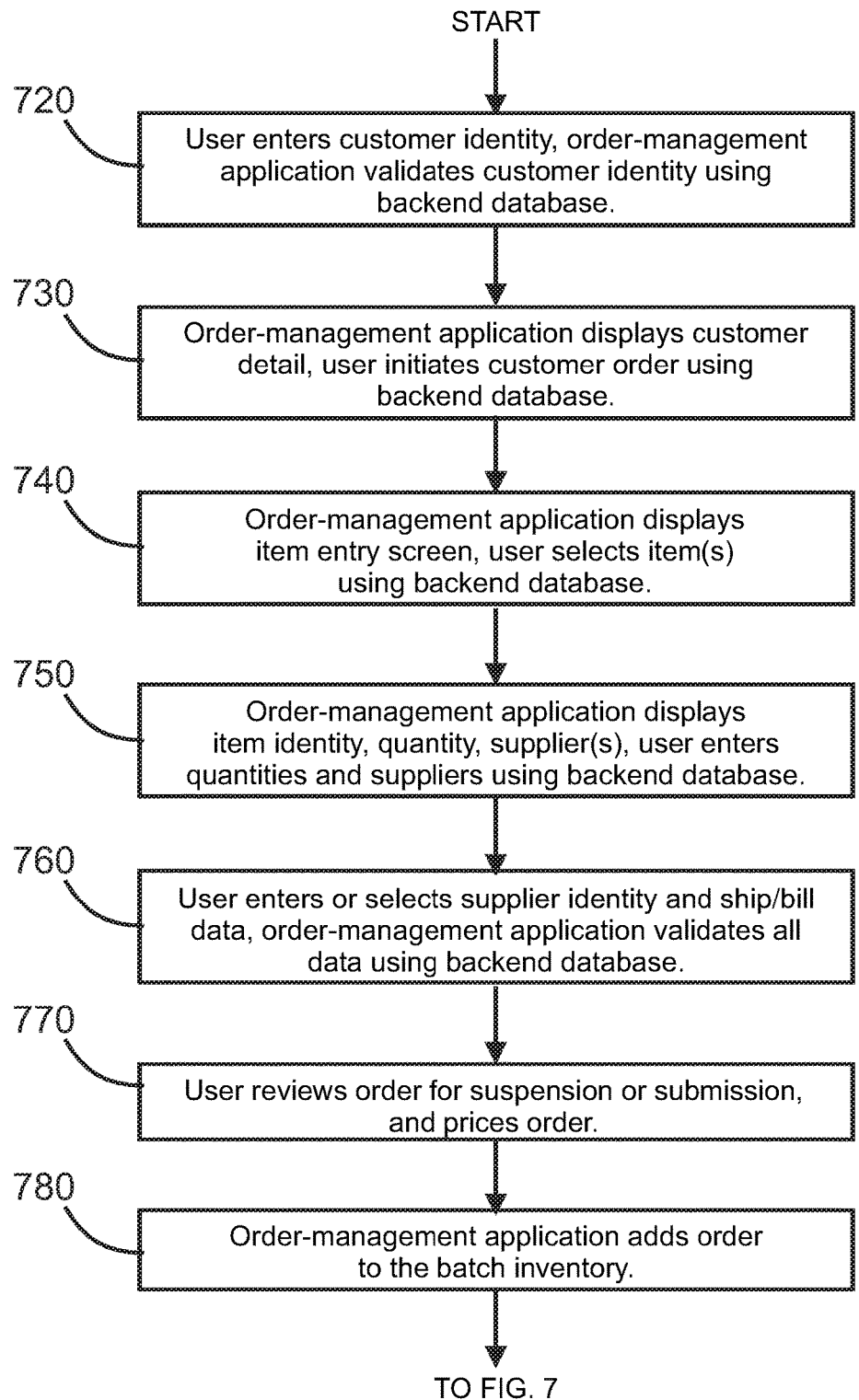
FIG. 7A is an example of a sequence of steps for implementing the order management system.

FIG. 7A is an example set of steps for implementing the order-management application 250 operating on the smartphone device. The user searches (720) the backend server's database as needed and selects the customer as validated by the application 250, searches (730) the backend server's database as needed for customer detail and selects the customer as validated by the application 250, searches (740) the backend server's database for item detail (description, characteristics, price) as needed and selects the item as validated by the application 250, searches the backend server's database as needed for package quantities, available quantities, and supplier detail (750) for each item, enters the item supplier as validated by the application 250, and adds the item to the current order. When the order content is complete (770), the user searches the backend database for customer shipping and billing information using the order-management application and reviews (780) the order for suspension or submission, and for pricing. When the order is submitted, the order-management application adds the order to the batch to be processed via upload.

Figure 7B:
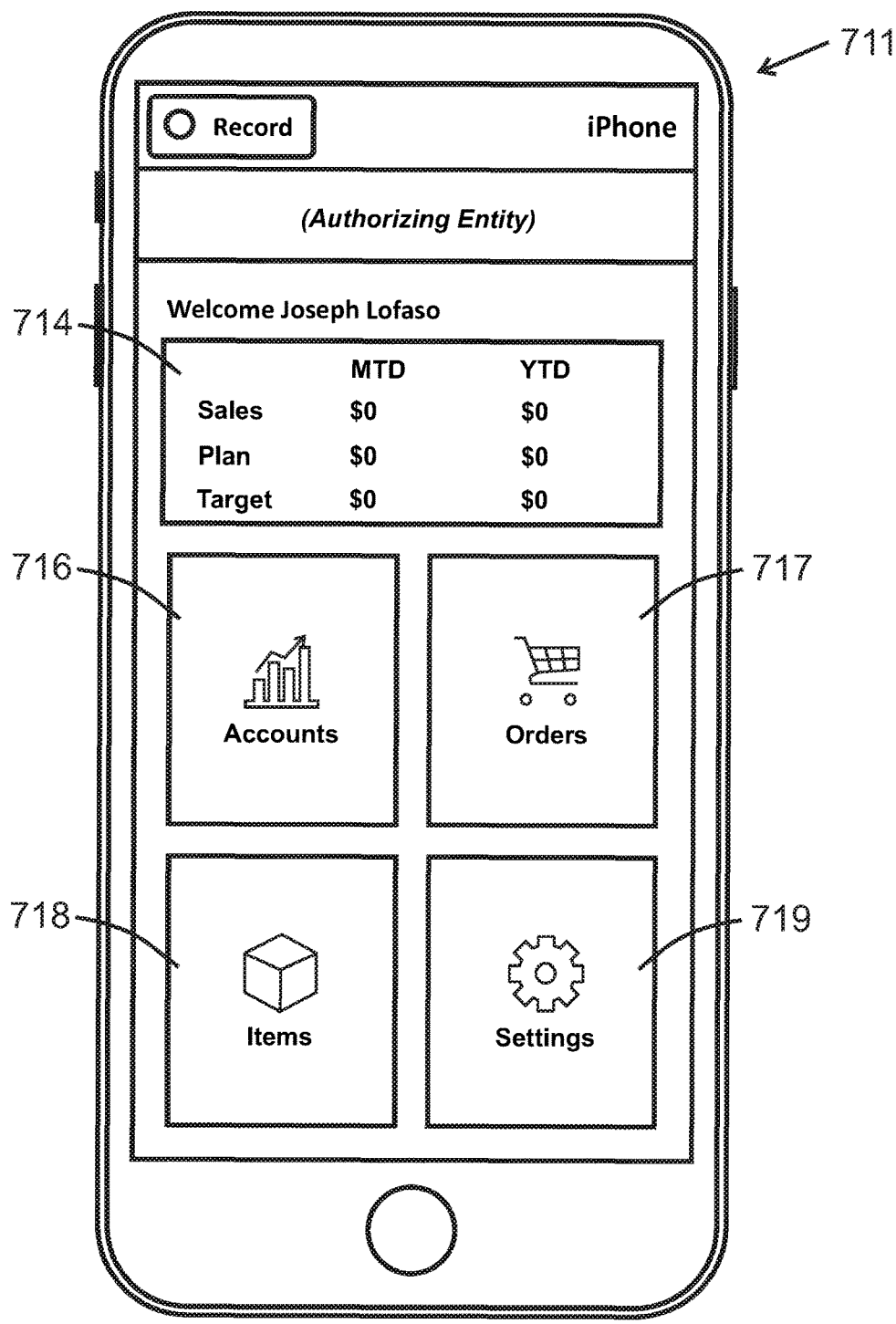
FIG. 7B is a smartphone-user screen initial display for the order management system.

FIG. 7B shows the user's view of the interface of order-management application 250 for the authorized user's initial display 711, which presents the user's current sales data 714 and a set of processing options from which to choose. The user may choose to search (716) customer accounts, process (717) orders, review or enter (718) items in an order, or review (719) settings for the application 250. If the user chooses to search customer accounts, see FIG. 7C. If the user chooses to process orders, see FIG. 7E. If the user chooses to review or enter items, see FIG. 7F. If the user chooses to review or change settings, a conventional menu of settings, their values, and data-entry slots is provided.

Figure 7C:
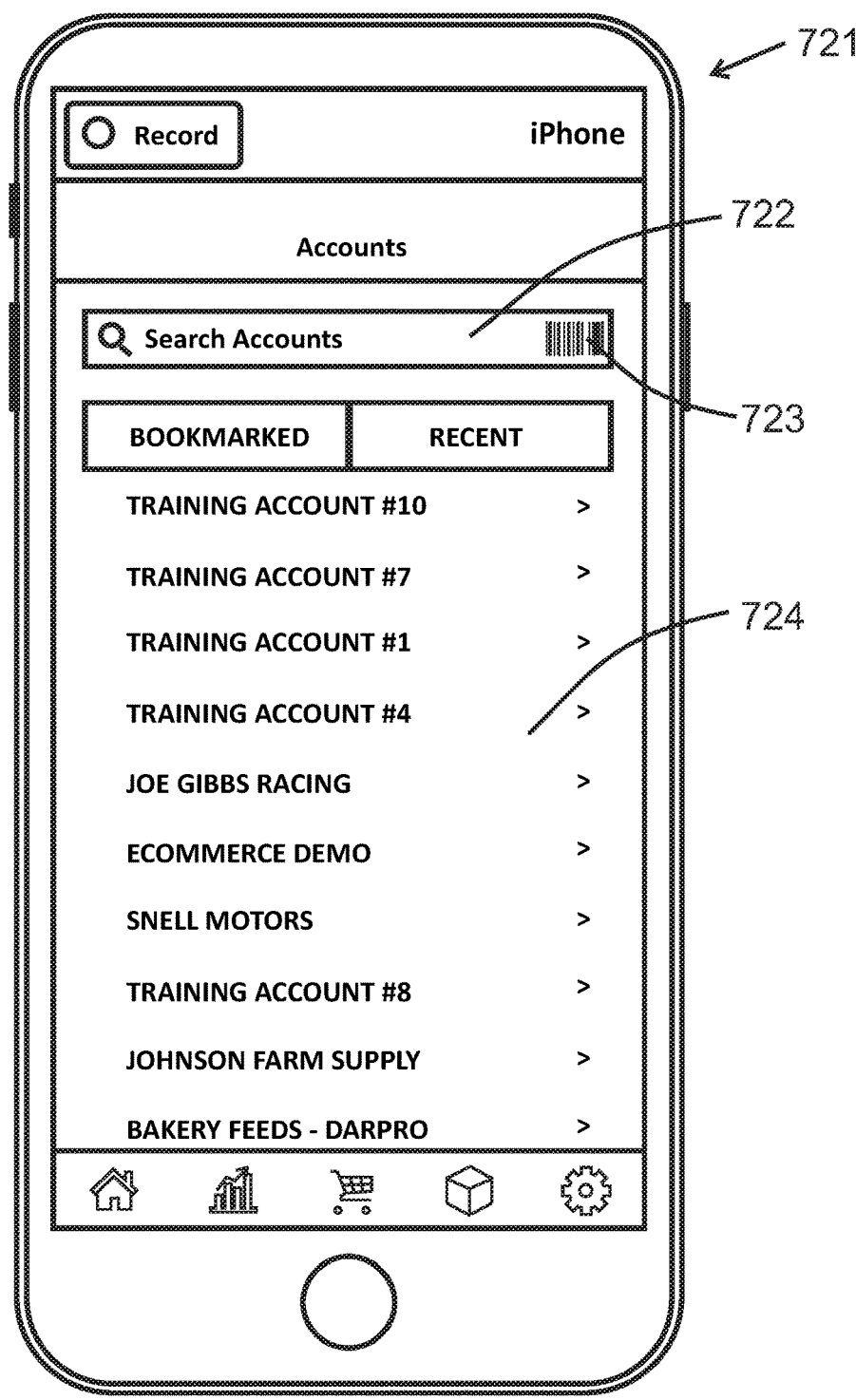
FIG. 7C is a smartphone-user screen customer search account request display for the order management system.

FIG. 7C shows the user's view of the interface of order-management application 250 for customer account search requests (721), which displays a search entry box and a list of customer accounts. The user may select a customer account from a list of accounts 724, submit keywords for search 722 which the application uses to search for matches, or scan a barcode 723. If the user selects an account from the list displayed, see FIG. 7E. If the user submits search keywords, see FIG. 7D.

Figure 7D:
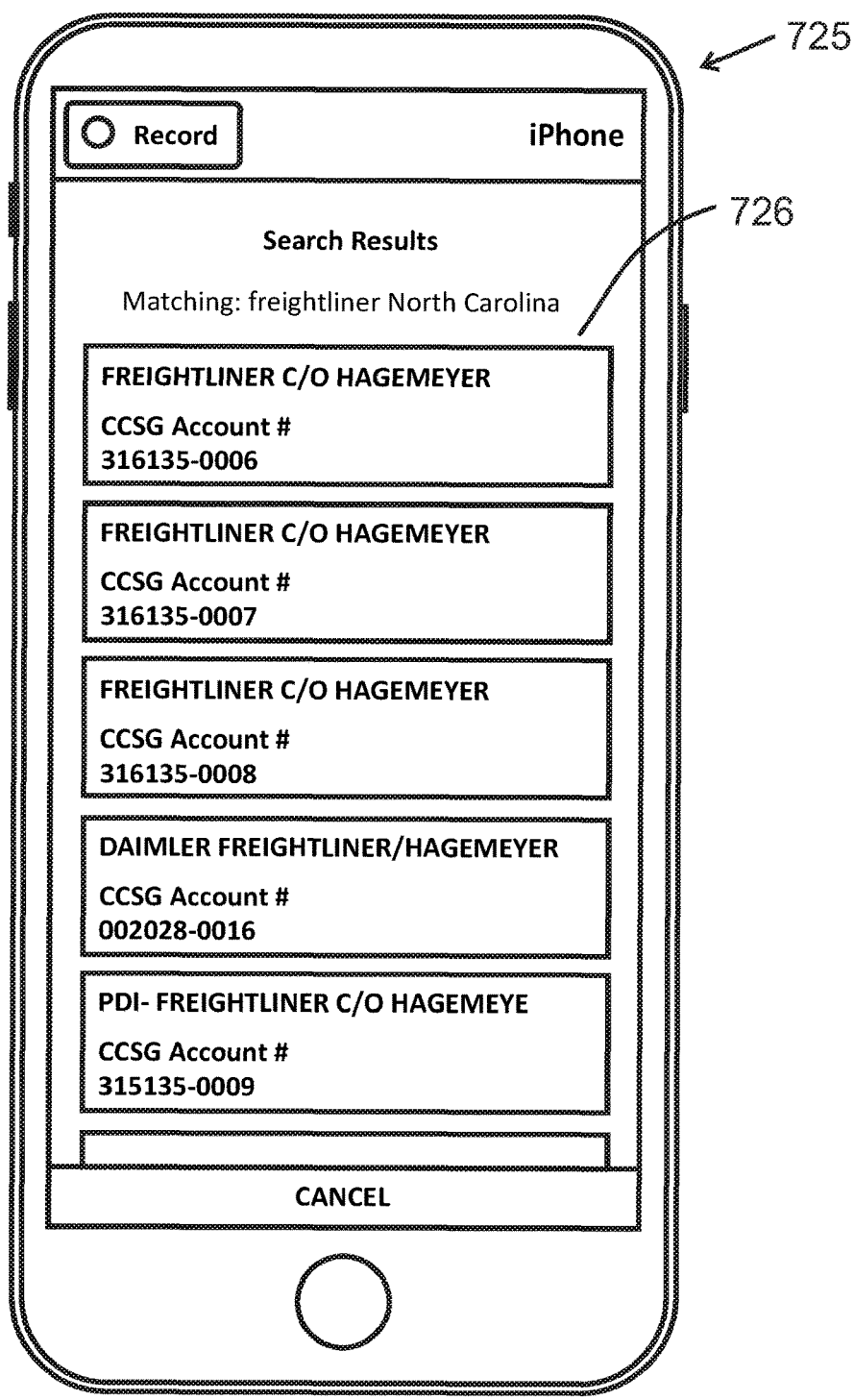
FIG. 7D is a smartphone-user screen customer search results display for the order management system.

FIG. 7D shows the user's view of the order-management application's interface for presenting (725) customer search results. The application displays a list 726 of customer entities matching the search criteria submitted, for review and selection by the user. If the user selects an account from the list displayed, see FIG. 7E.

Figure 7E:
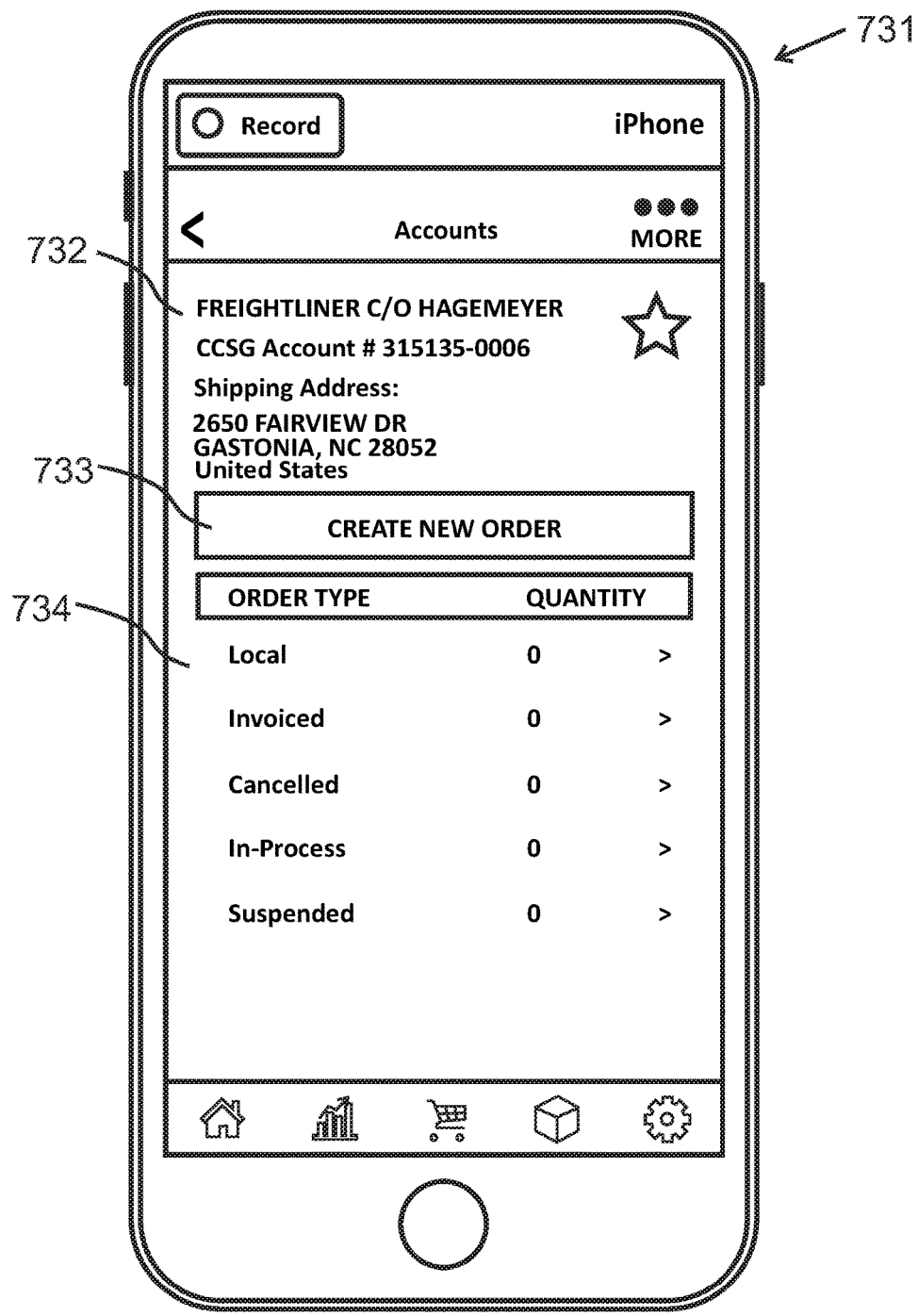
FIG. 7E is a smartphone-user screen customer detail and order creation display for the order management system.

FIG. 7E shows the user's view of the interface of order-management application 250 for presenting (731) customer detail 732 and creating (733) an order for a customer. Given selection of a customer by the user, the application displays customer detail 732 including shipping address and current order status summary, and a button to initiate (733) creation of a new order. The order status summary display 734 includes numbers of local, invoiced, cancelled, in-process, and suspended orders for the selected customer. For user selection of the button to create a new order for the displayed customer and begin entering items on the order, see FIG. 7F.

Figure 7F:
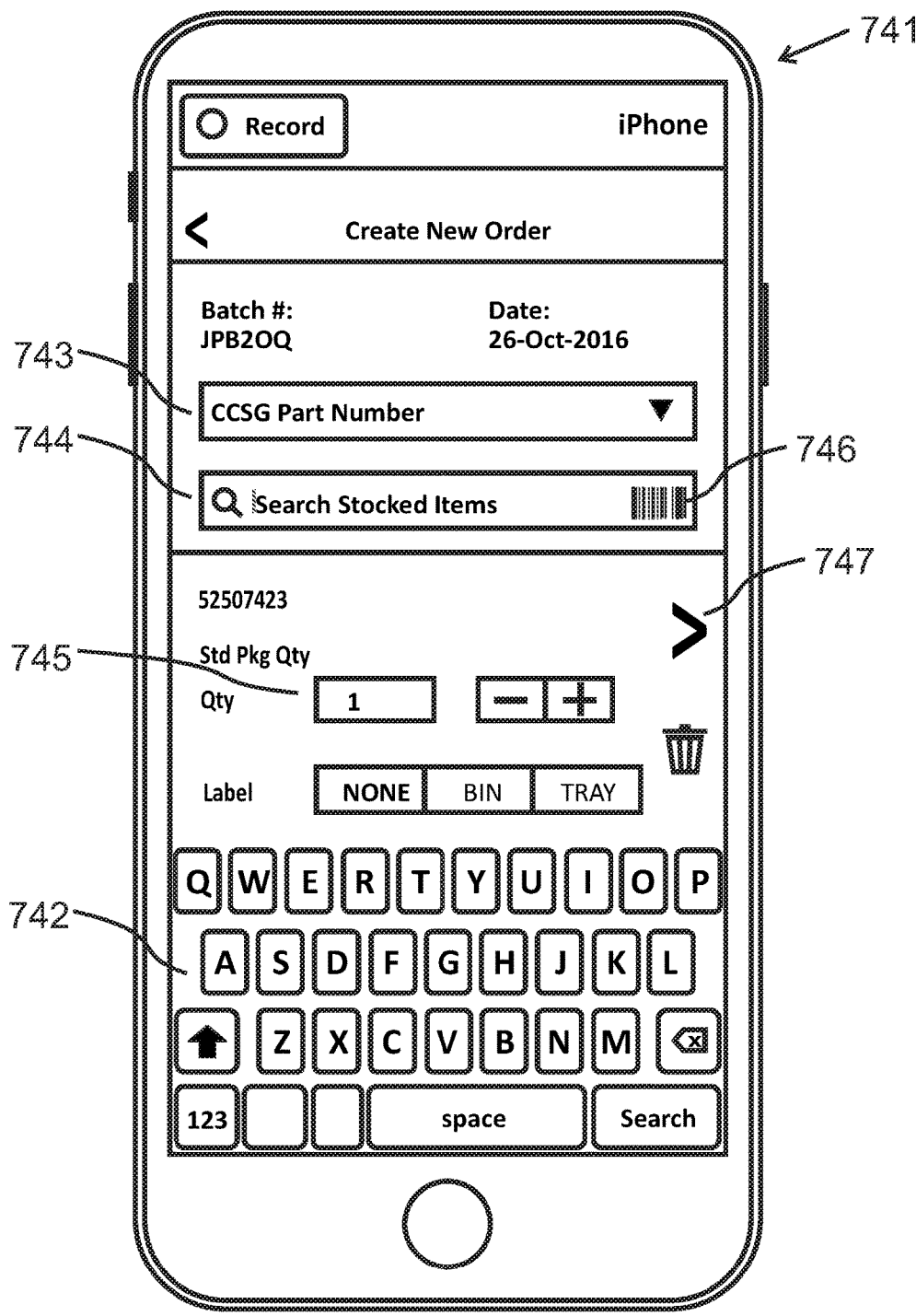
FIG. 7F is a smartphone-user screen order item entry display for the order management system.
Figure 7G:
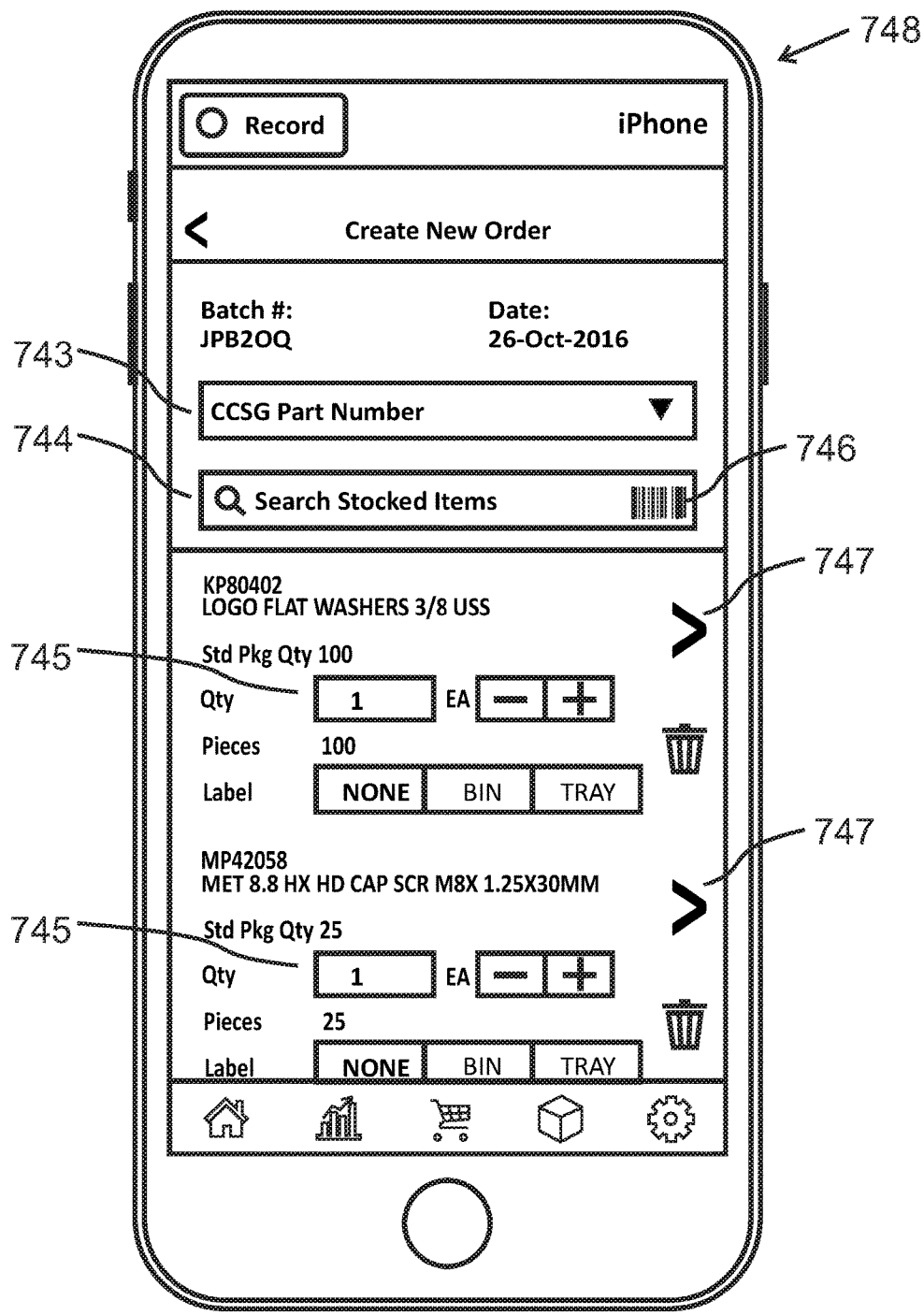
FIG. 7G is a smartphone-user screen order item detail entry for the order management system.
Figure 7H:
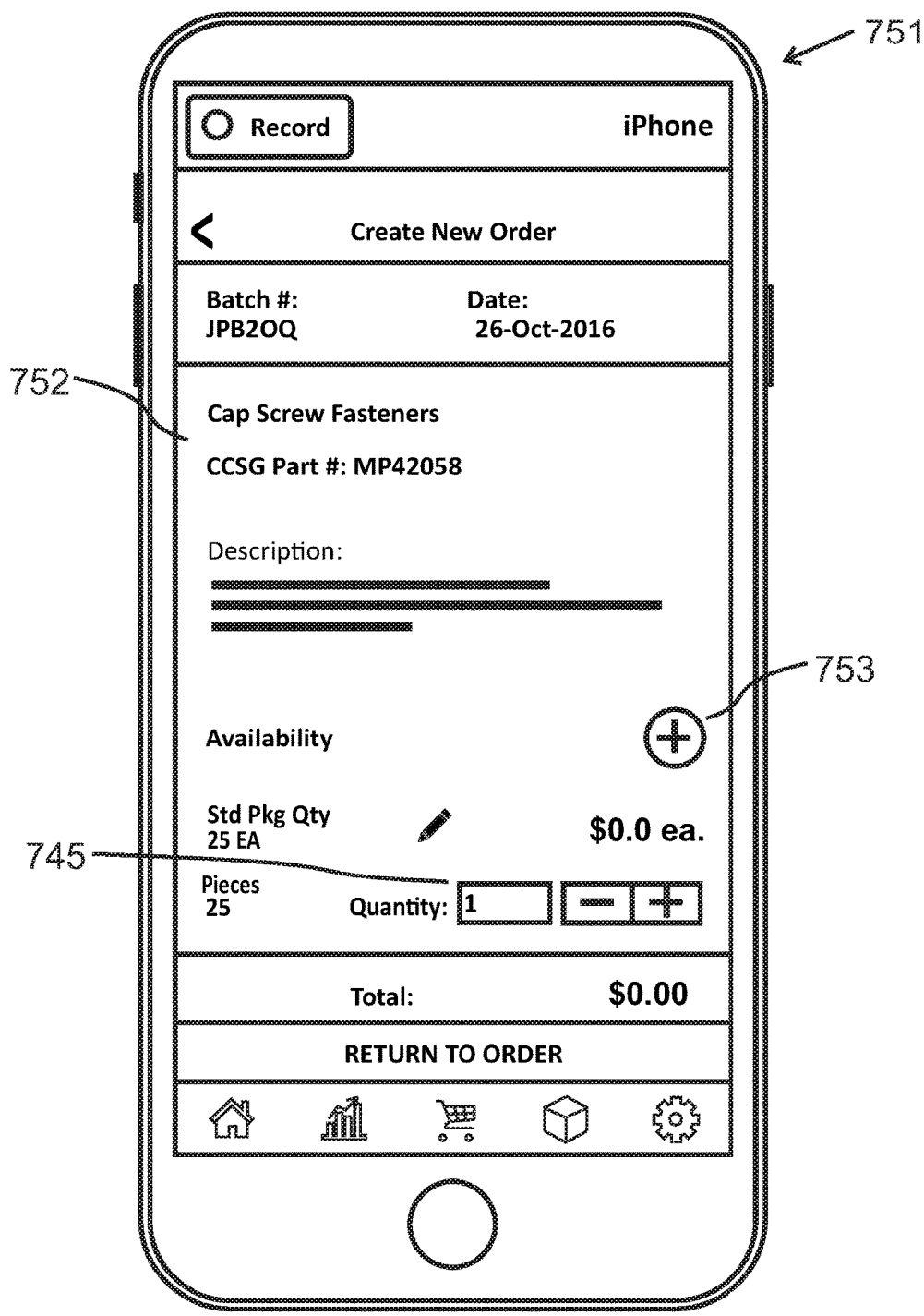
FIG. 7H is a smartphone-user screen order item detail and availability entry display for the order management system.
Figure 7J:
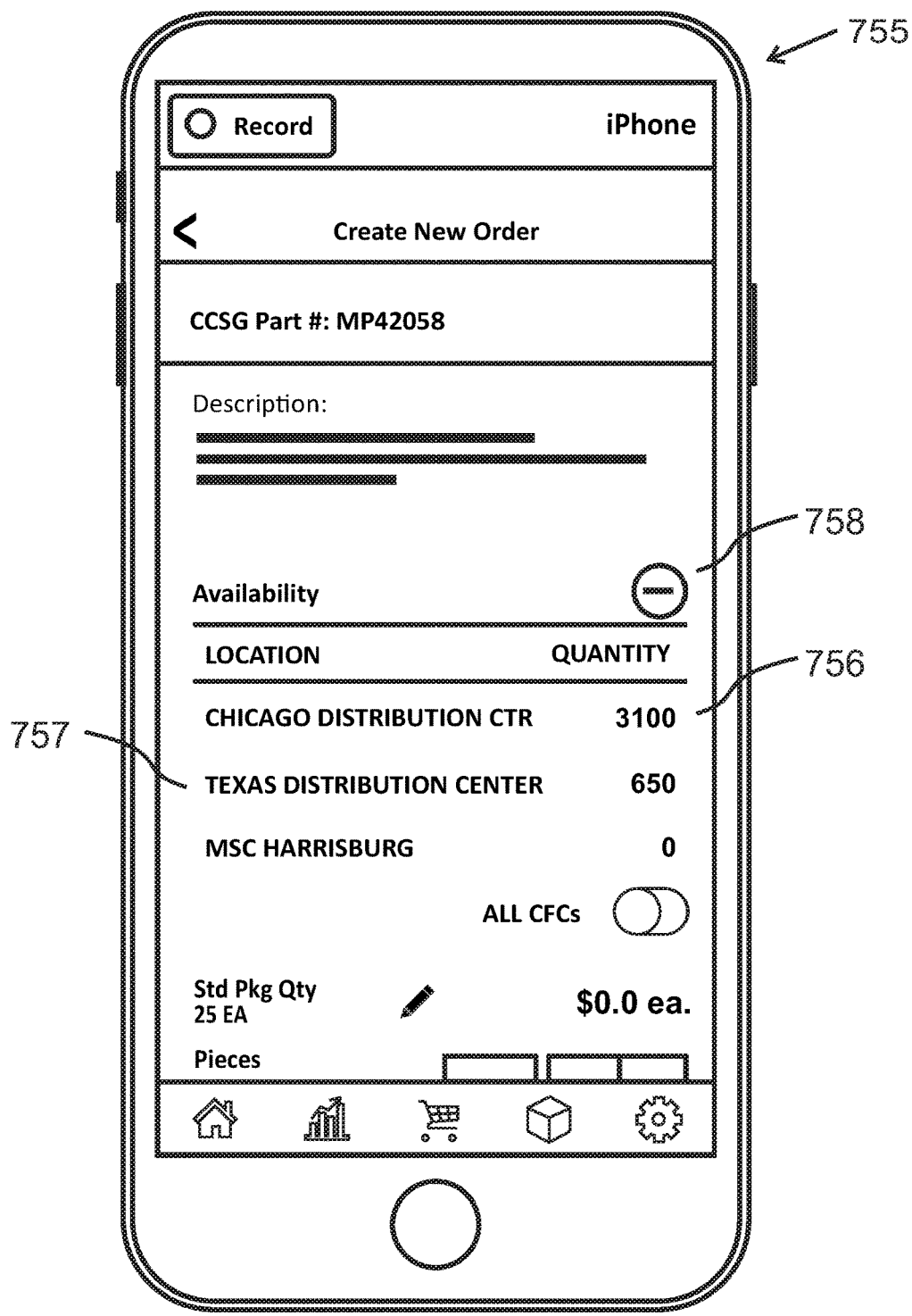
FIG. 7J is a smartphone-user screen order item supply availability display for the order management system.
Figure 7K:
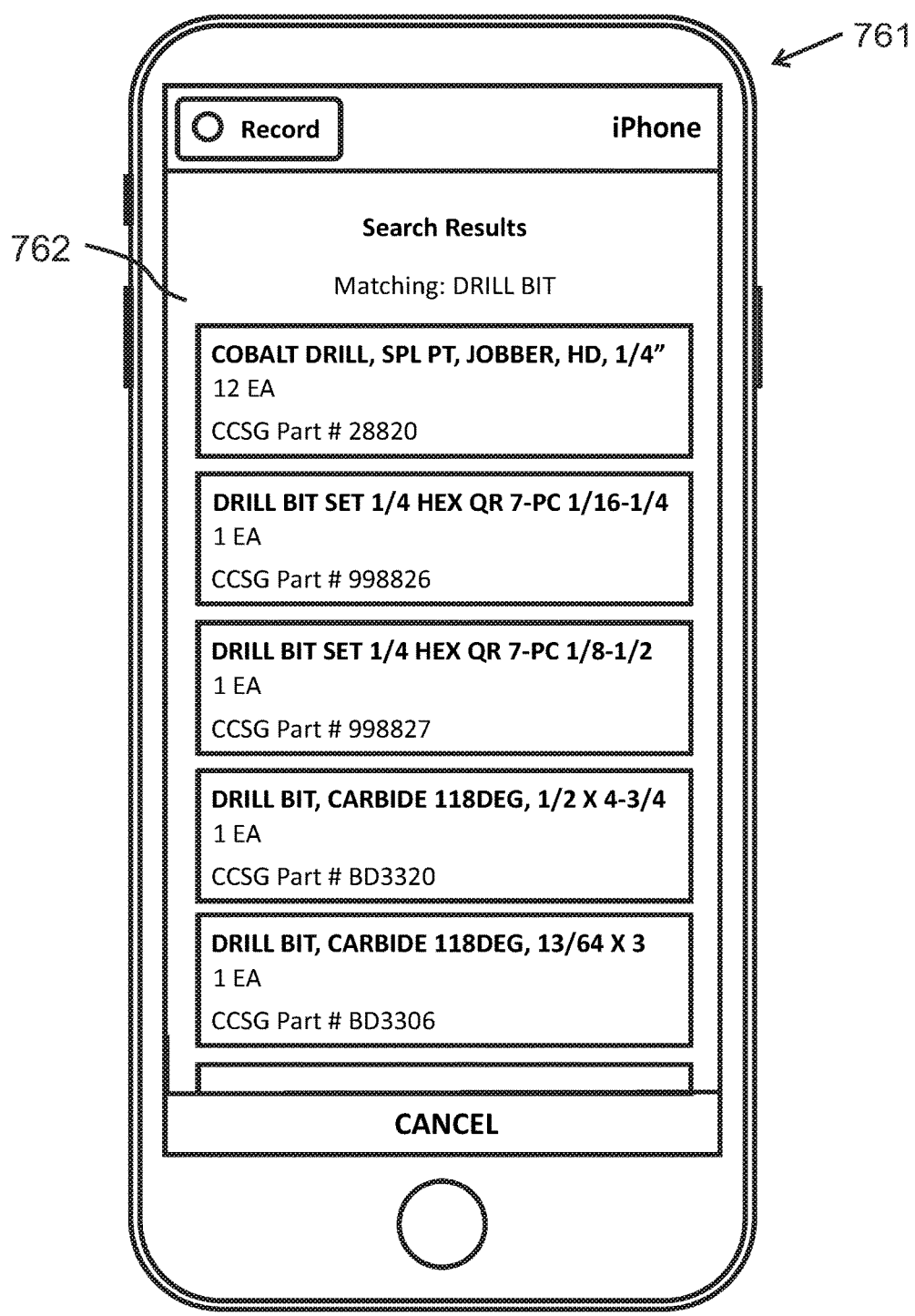
FIG. 7K is a smartphone-user screen order item search results display for the order management system.

FIG. 7F shows the user's view of the interface of order-management application 250 for entering (741) order items for a customer. The application displays a touch keypad 742 and input box 743 for entry of item number or name, a search input box 744 for searching for items in the backend item database, buttons and numeric-entry box 745 for entering item quantity, a barcode scan button 746 to scan part numbers, and arrow icons 747. Use of a right arrow selects an item for addition to an order, and initiates display of the application's interface for entering order item detail as shown in FIG. 7G. Search for items in the backend database displays a list of candidate items found as shown in FIG. 7K.

FIG. 7G shows the user's view of the interface of order-management application 250 for entering (748) order item detail for a customer. The application displays an input box 743 for entry of item number or name a search input box 744 for searching for items in the backend item database, buttons and numeric-entry box 745 for entering item quantity, a barcode scan button 746 to scan part numbers, and arrow icons 747. Use of a right arrow icon 747 selects an item for addition to an order, and initiates display of the application's interface for entering supplier item detail as shown in FIG. 7H. The search for items displays candidate items found as shown in FIG. 7K.

FIG. 7H shows the user's view of the interface of order-management application 250 for presenting (751) item detail 752. Use of the plus sign icon 753 displays supplier item availability quantities as shown in FIG. 7J. The order-management application displays a plus-sign button to provide immediate item availability display to the user, on demand, as shown in FIG. 7J. Use of the Return to Order button displays order item detail as shown in FIG. 7J.

FIG. 7J shows the user's view of the interface of order-management application 250 for presenting (755) supplier item quantities 756 and locations 757. Use of the minus sign icon 758 returns the display to that shown in FIG. 7H.

FIG. 7K shows the user's view of the interface of order-management application 250 for presenting (761) a list of item search results 762. Selection of an item from the list returns item detail as shown in FIG. 7H.

Figure 7L:
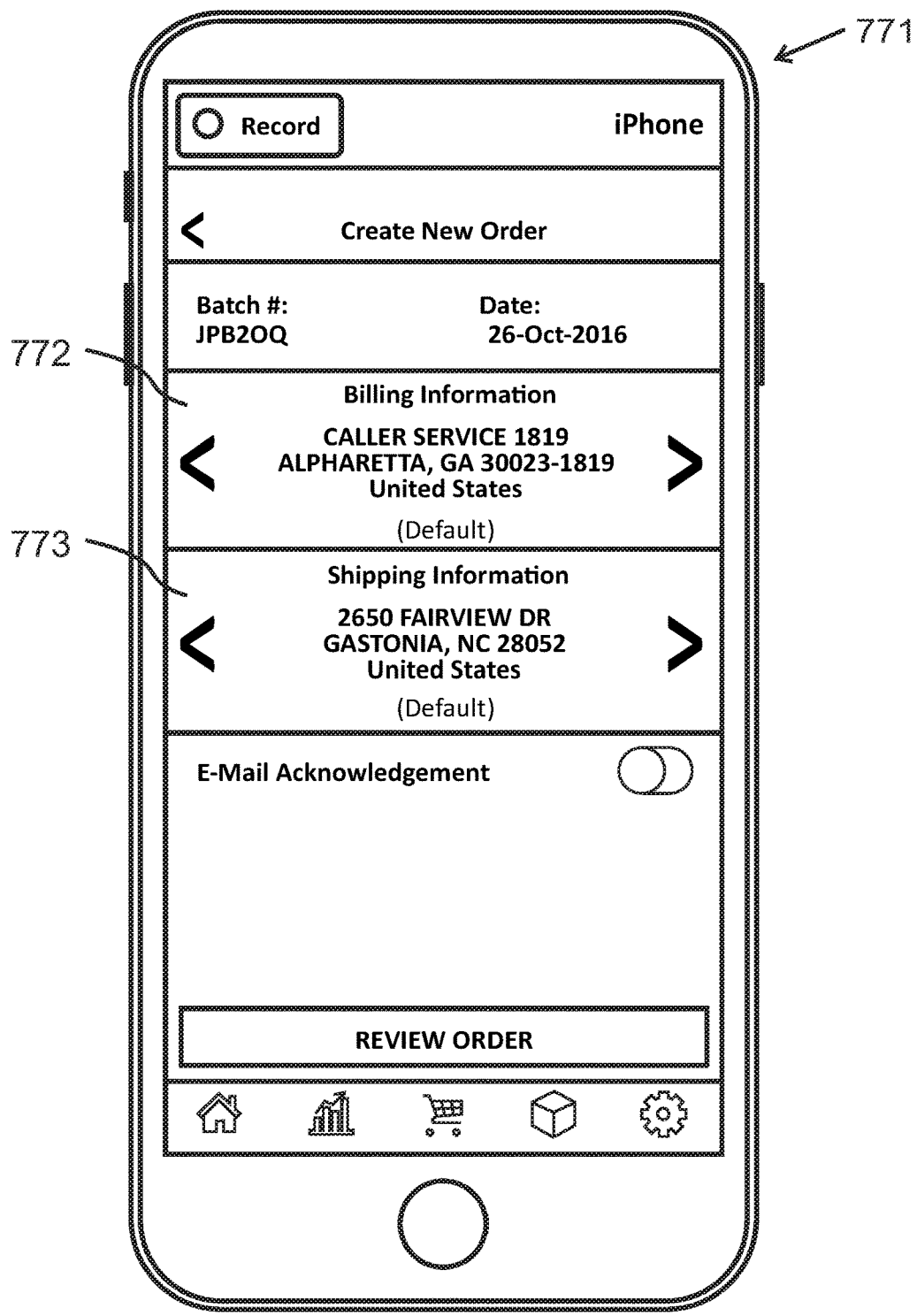
FIG. 7L is a smartphone-user screen customer billing and shipping data display for the order management system.

FIG. 7L shows the user's view of the interface of order-management application 250 for presenting (771) billing detail 772 and shipping detail 773 for selection for an order. Use of the Review Order button displays order suspense and submission choices as shown in FIG. 7M.

Figure 7M:
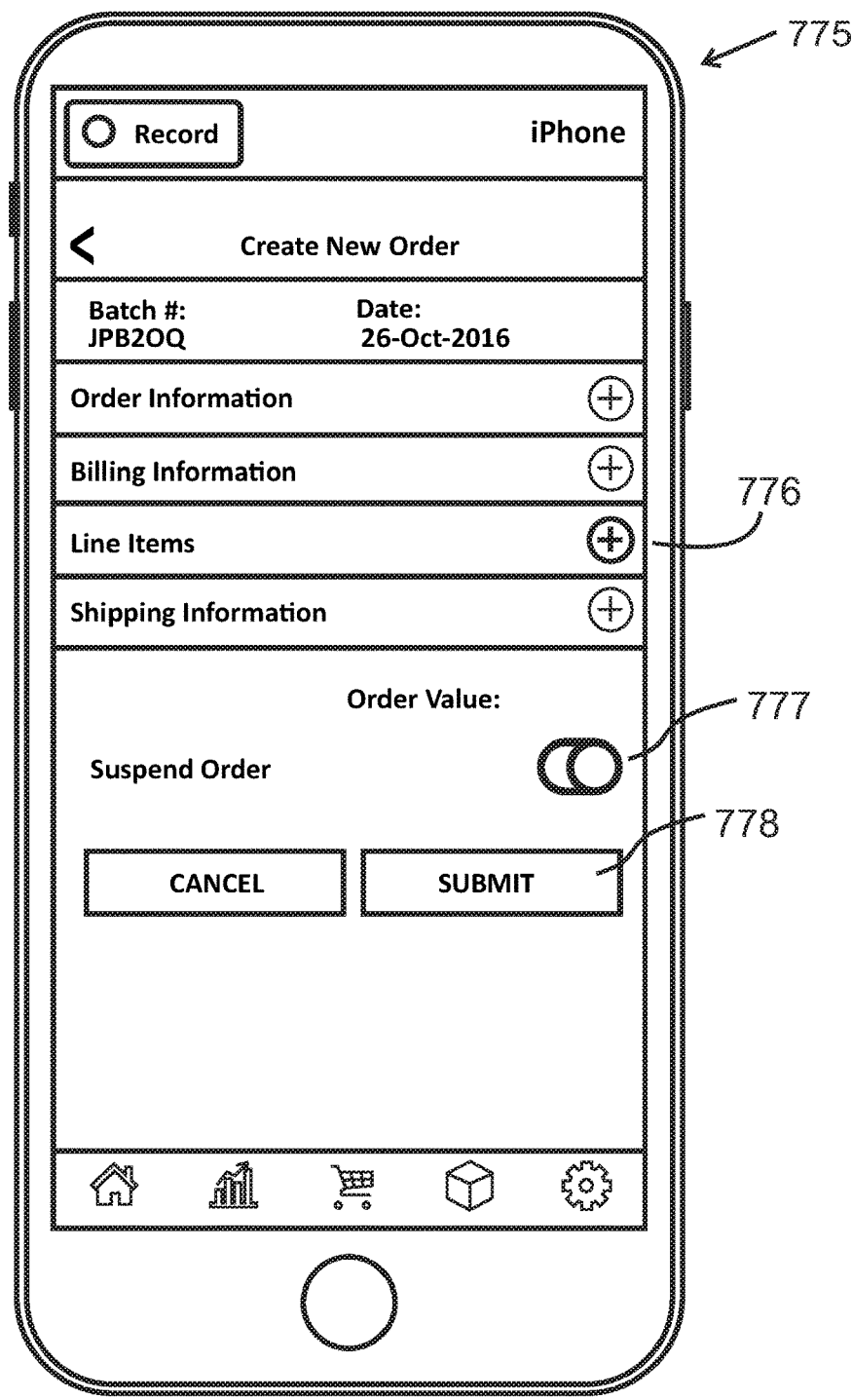
FIG. 7M is a smartphone-user screen order suspense and submission entry display for the order management system.

FIG. 7M shows the user's view of the interface of order-management application 250 for order suspense and submission 775, before order pricing. Use of any highlighted plus sign 776 displays the selected category of order information: the order itself, billing, line items, and shipping. Use of the Suspend slider 777 places the order in suspense for later review. Use of the Submit button 778 presents the order pricing display as shown in FIG. 7N.

Figure 7N:
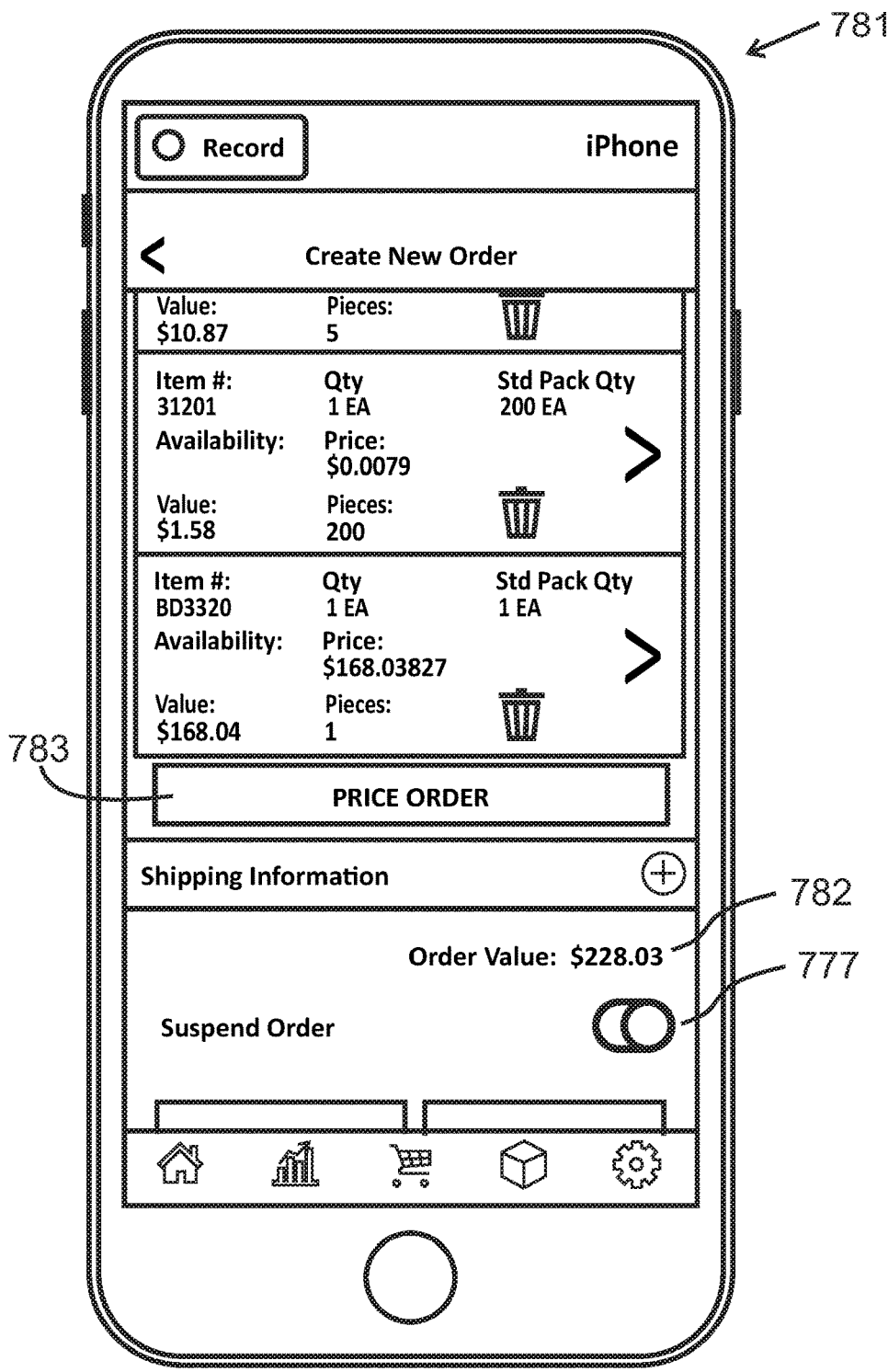
FIG. 7N is a smartphone-user screen order pricing entry display for the order management system.

FIG. 7N shows the user's view of the interface of order-management application 250 for order pricing (781) after pricing is done, with prices included in the display.

Figure 7P:
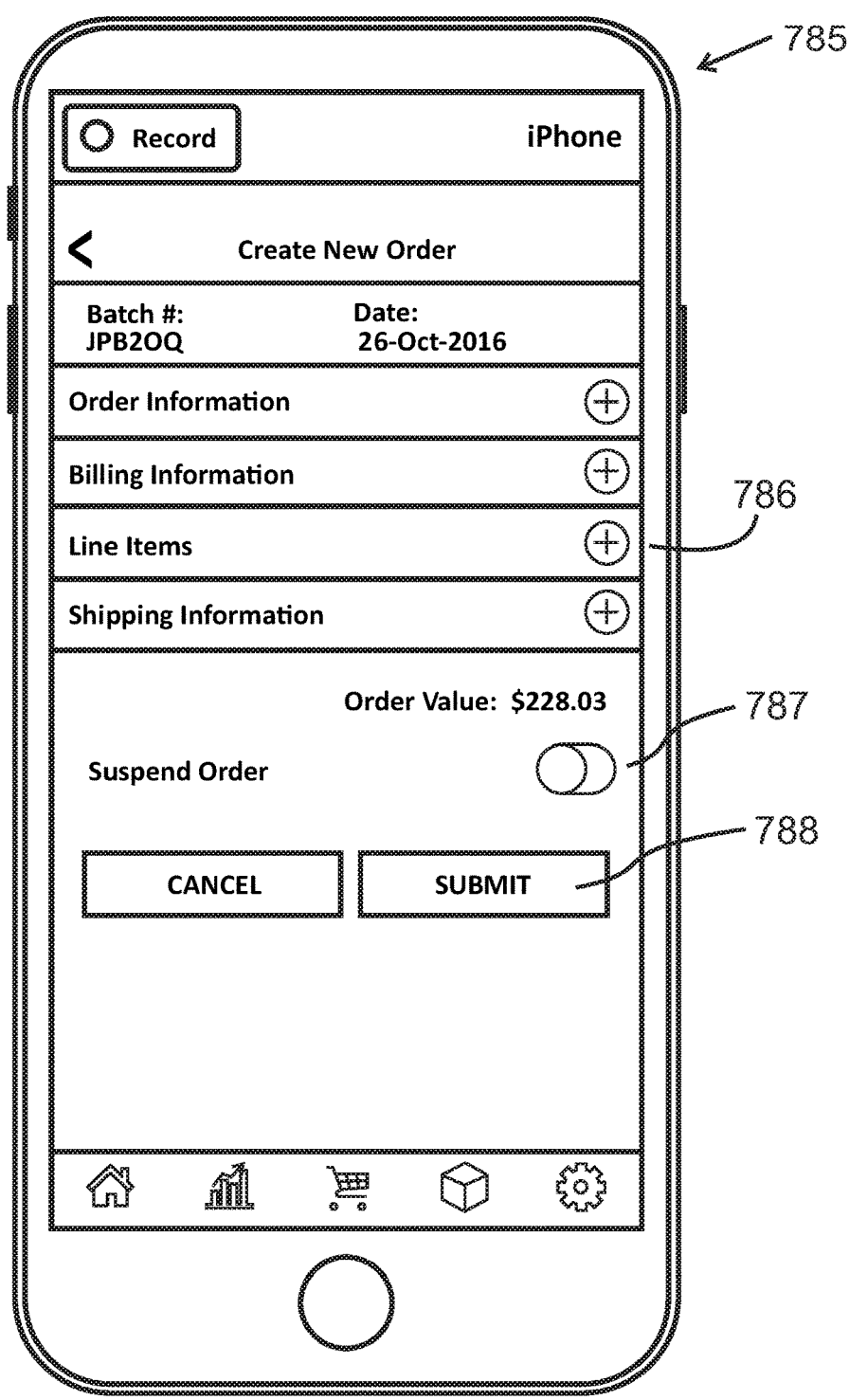
FIG. 7P is a smartphone-user screen priced-order suspense and submission entry display for the order management system.

FIG. 7P shows the user's view of the interface of order-management application 250 for order suspense and submission (785) once pricing is done. Use of any highlighted plus sign 786 displays the selected category of order information: the order itself, billing, line items, and shipping. Use of the Suspend slider 787 places the order in suspense for later review. Use of the Submit button 788 submits the order to the supplier(s) via the API.

Figure 7Q:
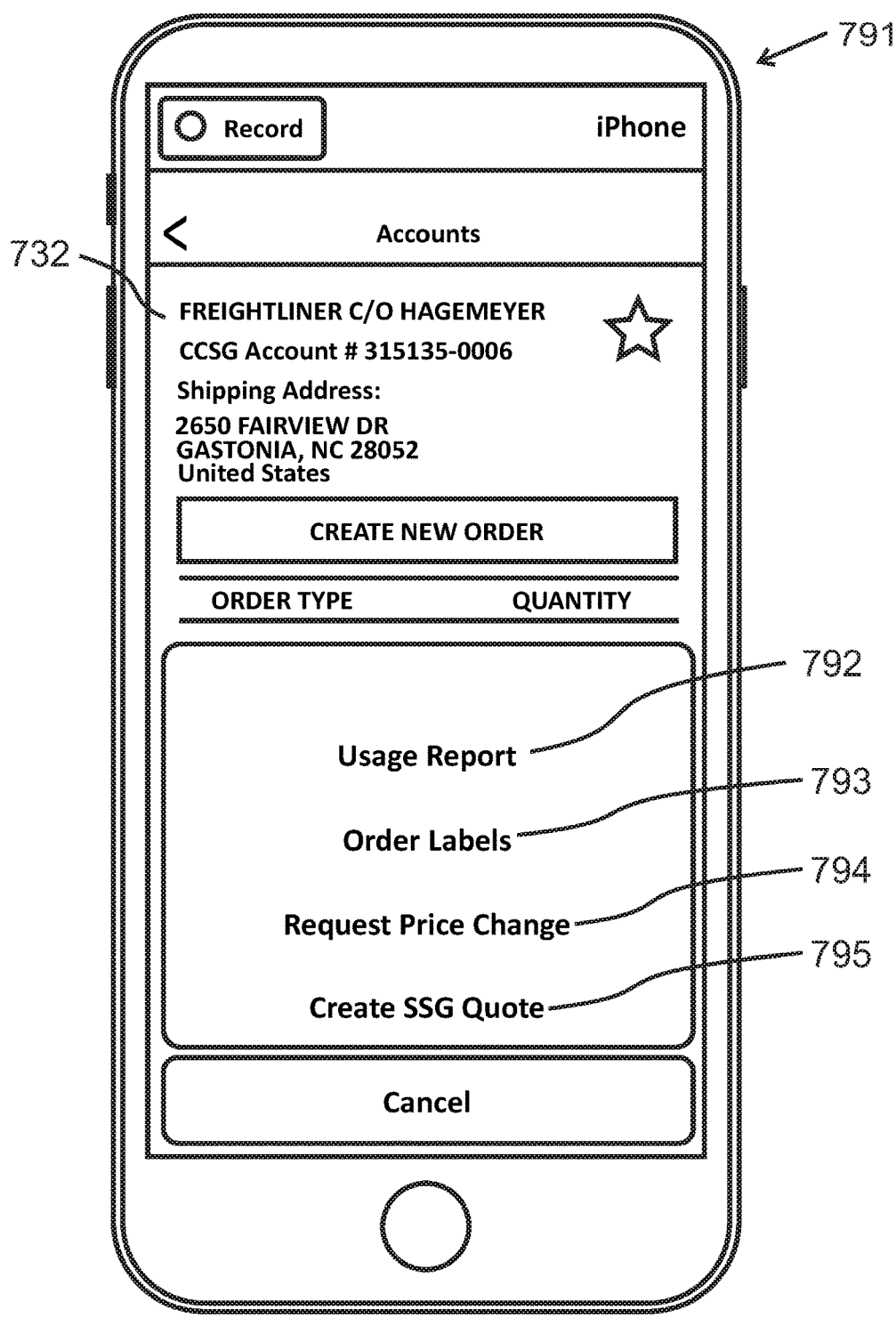
FIG. 7Q is a smartphone-user screen special order options display for the order management system.

FIG. 7Q shows the user's view of the interface of order-management application 250 for presenting (791) special order options including usage report, label ordering, price change requests, and SSG quotes.

Once all desired items have been scanned according to the first simpler ordering process or entered according to the second comprehensive ordering process, or entered in some combination of said processes, and no more items are to be added to the batch (step 700), the process returns to the steps of FIG. 3.

Figure 8:
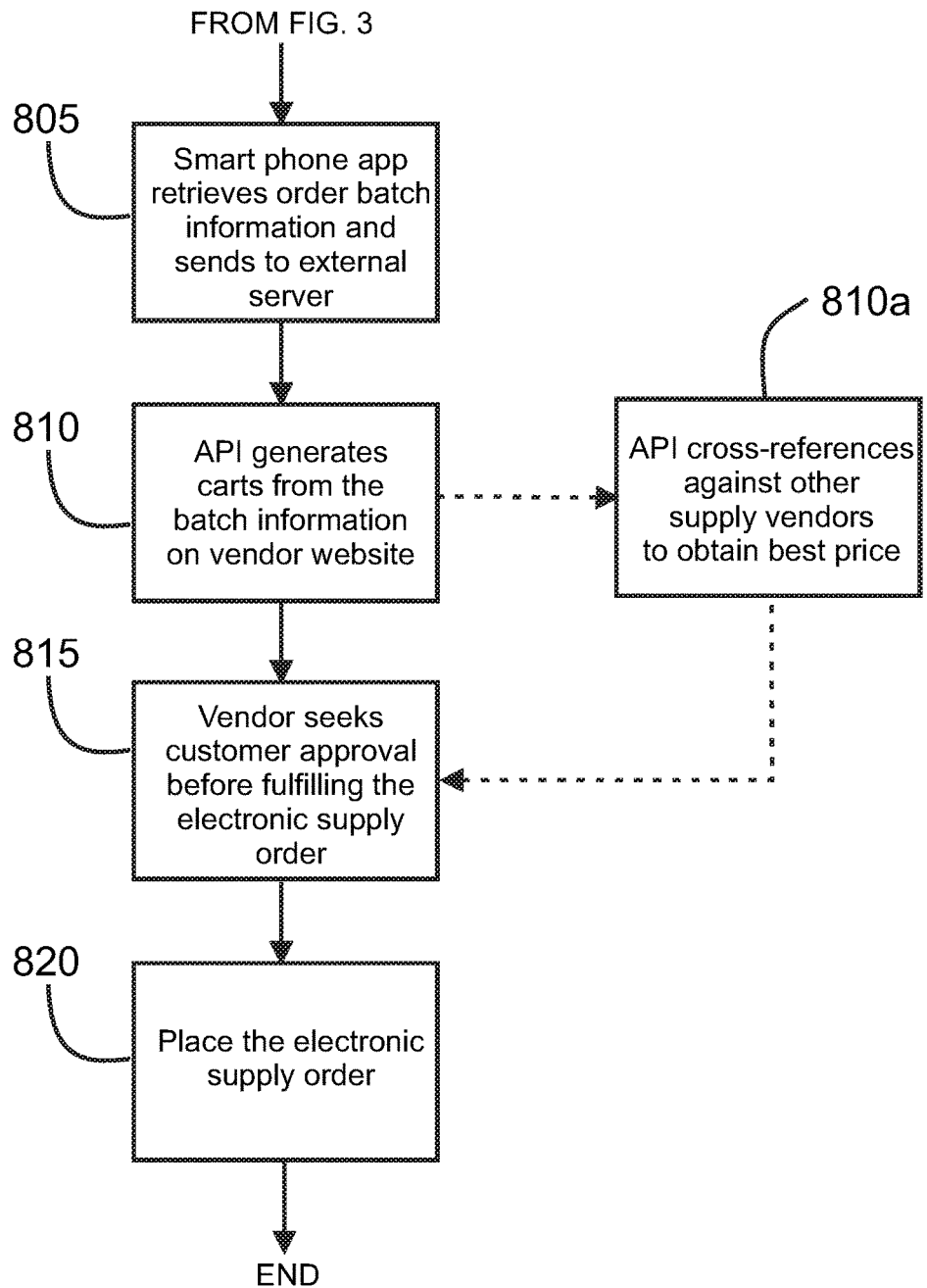
FIG. 8 is a continuing sequence of steps for implementing the supply ordering system.

FIG. 8 is a continuing sequence of steps for implementing the supply ordering system, illustrating the process by which a user adds batches to the upload queue. Uploads may be commenced upon receiving an indicator that the user wishes to initiate uploads by way of an API 120. Alternatively, they may be performed periodically and automatically by the upload software application 220. The upload software application 220 running on the smartphone device 110 may retrieve order information from the upload queue and send the information to the required external server (step 805), such as by way of the API 120 (as described above).

Subsequently, order generator software with the API 120 may automatically create an electronic supply order 150 for one or more batches on the vendor server 125 (step 810). For example, the order generator with the API 120 may create a "shopping cart" 210 on the primary vendor website and populate it with the items desired in the relevant order batch. Alternatively, the order generator may create an electronic order 150 in other formats, such as fax transmittal or e-mail. If desired, the API order generator software may access competing vendor websites and cross reference prices for similar items and provide the comparison for the customer's benefit (step 810*a*). Finally, the vendor may seek customer approval before contracting to fulfill the electronic supply order 150 (step 815). Once approved, the electronic supply order 150 may be placed (step 820). Alternatively, information may be sent directly to the primary vendor server 125, and the order may be generated directly.

Refer to FIG. 2. The availability of order management application software 250 and backend access software 240 on the user's smartphone device to serve user search, selection, and entry of detailed order information on items, quantities, prices, suppliers, billing and shipping processes, and other information as required for completion and direct submission of orders greatly simplifies the requirements for order generator software with the API 120. The user may in this simplification conduct all vendor comparisons, customer dialog, vendor dialog, and selections at the time of order submission, thereby obviating or reducing similar functions performed by the API after order submission.

Figure 9:
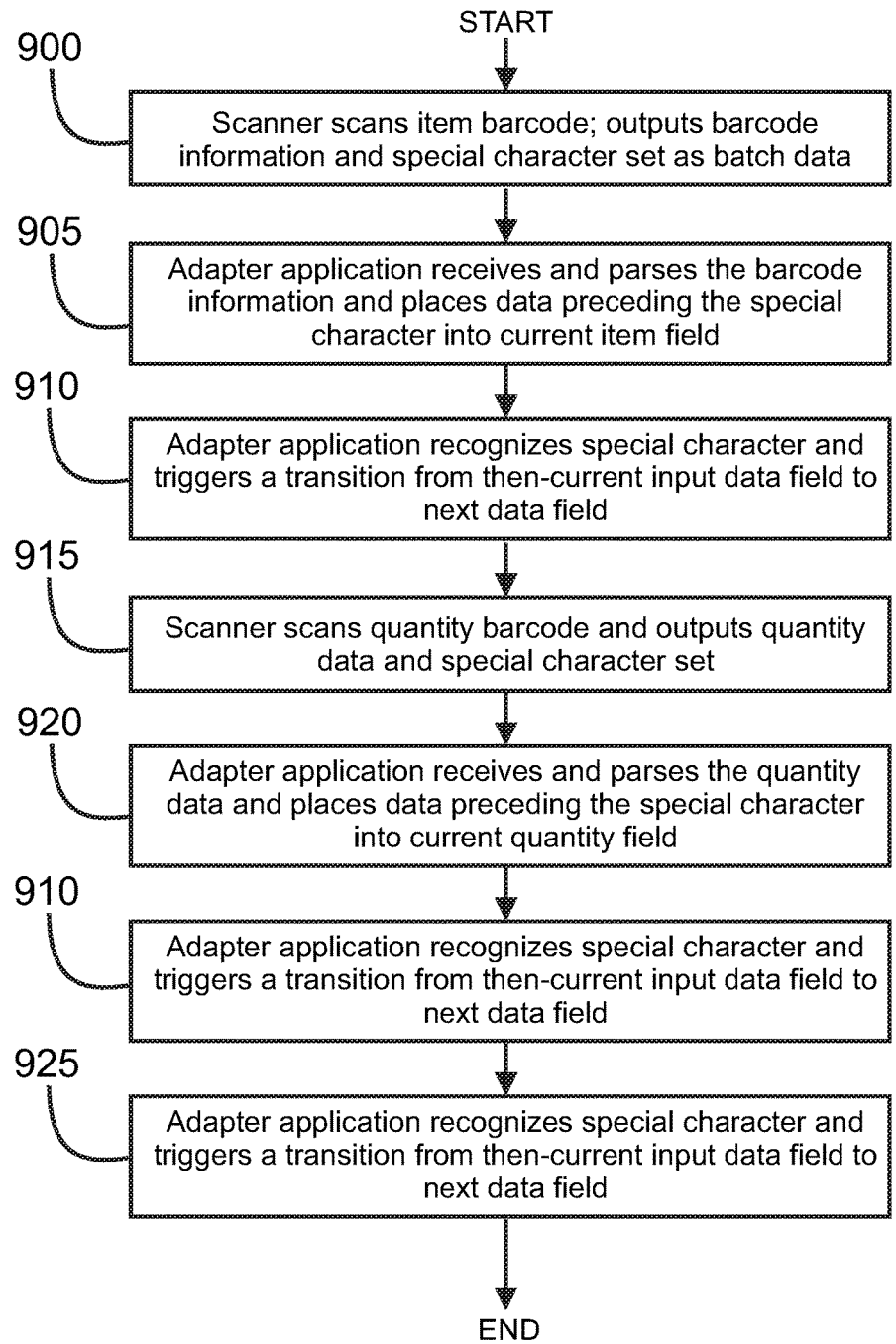
FIG. 9 is an example of a sequence of steps for implementing adapter software for one embodiment of the supply ordering system.

FIG. 9 is an example sequence of steps for implementing the adapter software application 220*a* for one embodiment of the supply ordering system. As described above, the adapter application 220*a* may be loaded on smartphone device 110 to enable or facilitate communication between the portable scanner device 100 and the smartphone device 110 in instances where communication between the smartphone device 110 and the portable scanner device 100 is hindered, such as when the smartphone device 110 is incapable of recognizing and parsing data configured according to HID, CDC, Honeywell API or SPP protocol received via an input port from the portable scanner device 100.

In one embodiment, each item barcode 155 may have a special character appended to the end of the barcode. The special character is used to delineate the end of a piece of information and can be used to automatically trigger a change from one data input field in the upload application 220 to another. A special quantity barcode sheet containing quantity barcodes may also be provided to allow a user to scan in desired quantity information using the portable scanner device 100. This may enable quick and easy input of quantity using the portable scanner device 100. The quantity barcodes may also similarly utilize a special character to auto automatically trigger a change from one field to another.

When the portable scanner device 100 scans an item barcode, the barcode information (including the special character) may be output by the scanner as batch data configured according to either an HID, CDC, Honeywell API or SPP protocol and transmitted to the smartphone device 110 (step 900). The adapter application 220*a* operating on the smartphone device 110 receives the data, parses it, and causes the data preceding the special character to be inserted into a current data field corresponding to an item identifier within the upload application 220 (step 905). The adapter application 220*a*, upon encountering a special character, triggers a transition from the then-current input data field to the next data field in the upload application 220, which may correspond to, for example, a field for additional item information or an item quantity (step 910).

Subsequently, in the case of a transition to a quantity field, the portable scanner device 100 may be used to scan a quantity barcode, outputting data reflecting the quantity and a special character (step 915). As before, the adapter application 220*a* receives and parses the quantity data (excepting special characters) and places it into the then-current field in the upload application 220, which is the quantity field (due to step 910) (step 920). Again, when the adapter application 220*a* identifies a special character following the quantity barcode data, an automatic transition to the next data field within the upload application 220 is triggered, which may correspond with a new item data field (step 925). This process may be repeated as necessary for items until all items desired have been entered into the order batch.

FIG. 7B summarizes a computer-implemented method for retrieving and displaying sales metrics, account detail, order history, and product detail information. The method includes entering on the smartphone device a request for the user's sales metrics 714, a request for detail information 716 on a specific account, a request for the user's order history 717, or a request for detail information 718 on a specific product or item, to a data-retrieval and display application operating on the smartphone device. The system additionally includes a backend server configured to retrieve and return detailed sales metrics 714 for the user, account detail 716 for a specified account, order history 717 for the user, and product detail 718 for a specified product to the retrieval and display application. The retrieval and display application parses the request, and sends the request data to the backend server. The backend server parses the request data, processes the request, and returns the response to the smartphone device. The retrieval and display application then displays the response to the user.

User sales metrics 714 include totals for sales, plan, and target for both month-to-date and year-to-date categories, enabling users (i.e., associates) to see how their sales are tracking to their target goals. Account detail information 716 includes account numbers, names, and addresses for both ship-to and bill-to categories, enabling users to confirm the account under which to place an order.

Order history information 717 includes ship-to account number & name, order number, batch number (unique value auto generated by order-management application), order creation date, order value, and order status. The order history information report enables review of the current status of all orders placed.

Product/Item detail information 718 includes item number, customer item number (if used), item description, item characteristics, standard package quantity, item price, and item availability (across distribution centers). The product/item detail information enables review, screening, and selection of a product/item.

FIG. 7Q summarizes a computer-implemented method for submitting special processing requests from the sales associate (user), including generating (792) a customer usage report to show ordering trends, the printing (793) of barcode labels at a branch office, requests (794) for a price change directed to a back-office associate, and requests (795) for special sales quotes. The method includes entering on the smartphone device a request for the specific process to a process-request application operating on the smartphone device. The system additionally includes a backend server configured to perform the requested process and return a confirmation to the process-request application.

Submitting a request to print barcodes at the local branch provides the user with the labels needed for quick scanning of items during the order process.

Submitting a special item quote enables the user to accommodate unanticipated customer item requests at the time of order preparation, and provides for utilizing the smartphone's camera feature to capture images of an item in question. The special item quote request is submitted to back end associates to process, using links to backend servers.

Submitting a price change request enables the user to accommodate unanticipated customer price and quantity requests at the time of order preparation. The price change request is submitted to back end associates to process, using links to backend servers.

Submitting a usage report request generates a report for the user (sales associate) to enable review of a customer's ordering trends.

This application was described above with reference to flow chart illustrations and/or block diagrams of methods, apparatus (systems) and computer program products, and user screen examples, according to one or more embodiments. It is understood that some or all of the blocks of the flow chart illustrations and/or block diagrams, and combinations of blocks in the flow chart illustrations and/or block diagrams, and functions illustrated by user screen examples, can be implemented by computer program instructions. The computer program instructions may also be loaded onto the computing system to cause a series of operational steps to be performed on the computer to produce a computer implemented process such that the instructions that execute on the computer provide processes for implementing the functions/acts specified in the flowchart and/or block diagram block(s). These computer program instructions may be provided to the CPU of the computing system such that the instructions, which execute via the CPU of the computing system, create means for implementing the functions/acts specified in the flowchart and/or block diagram block(s).

These computer program instructions may also be stored in a computer-readable medium that can direct the computing system to function in a particular manner, such that the instructions stored in the computer-readable medium implement the function/act specified in the flowchart and/or block diagram block or blocks. Any combination of one or more computer usable or computer readable medium(s) may be utilized. The computer-usable or computer-readable medium may be, for example (but not limited to), an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Any medium suitable for electronically capturing, compiling, interpreting, or otherwise processing in a suitable manner, if necessary, and storing into computer memory may be used. In the context of this disclosure, a computer-usable or computer-readable medium may be any medium that can contain, store, communicate, propagate, or transport the program for use by or in connection with the instruction execution system, apparatus, or device. The computer usable program code may be transmitted using any appropriate medium, including (but not limited to) wireless, wire line, optical fiber cable, RF, etc.

Figure 10A:
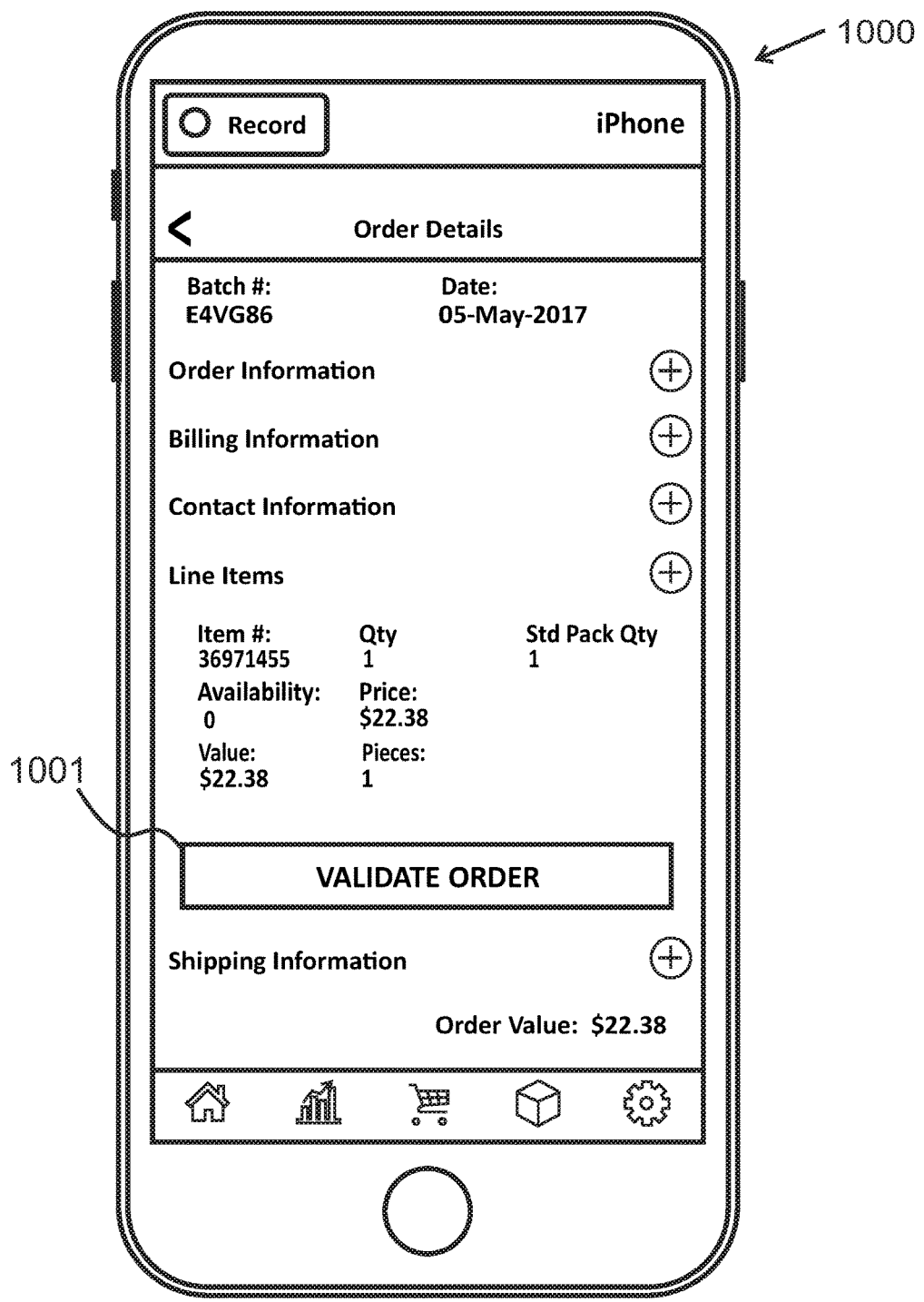
FIG. 10A is a smartphone-user screen current order validation display for the order management system.
Figure 10B:
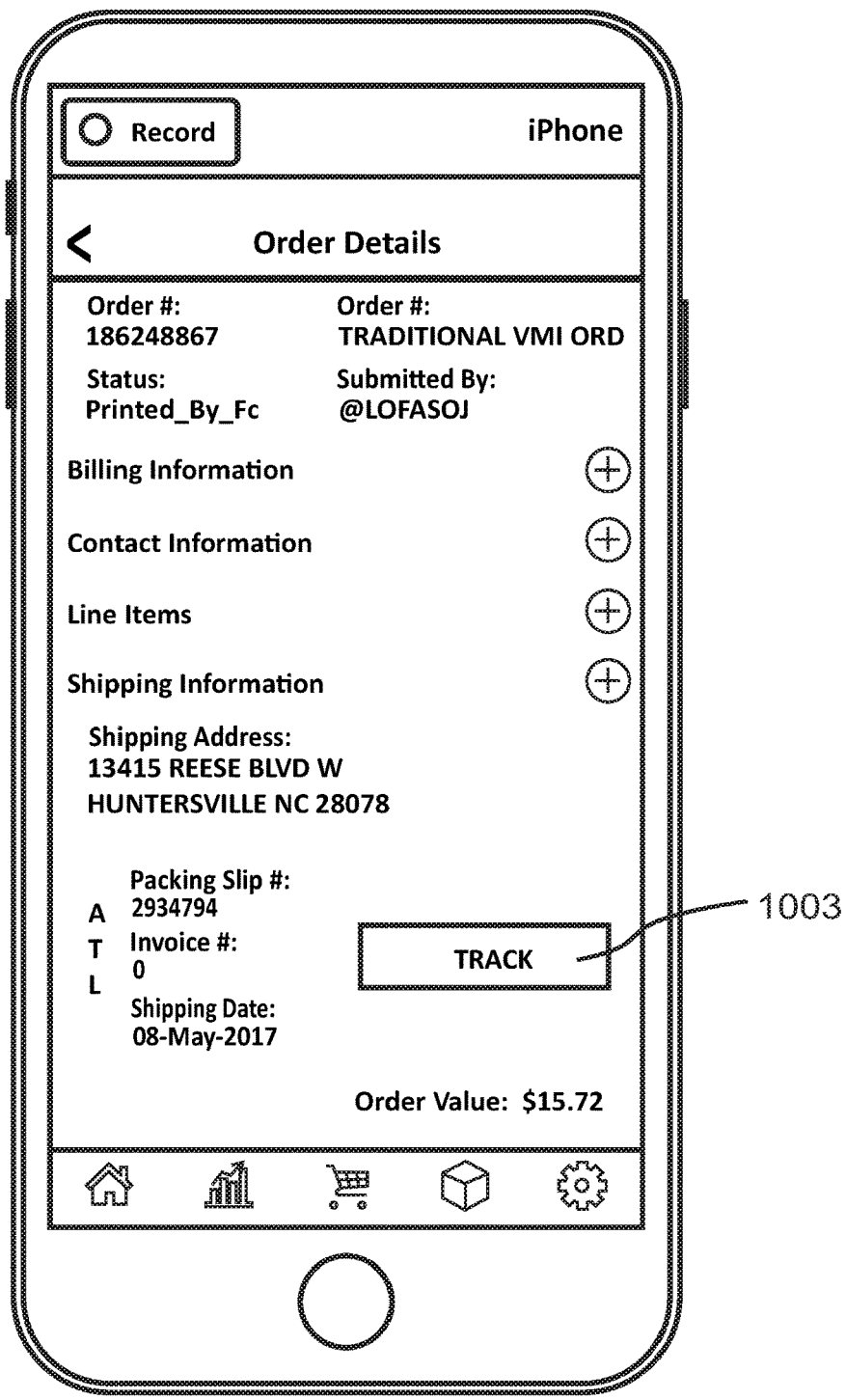
FIG. 10B is a smartphone-user screen current order tracking display for the order management system.

Other functionality provided by the system of the present invention includes the ability to call up the current status of an order that has been placed, such as an order that has been placed and is being "picked" from inventory. FIG. 10A depicts such functionality as a smartphone-user screen current order validation display 1000 for the order management system. The order may be validated at 1001. FIG. 10B is a smartphone-user screen current order tracking display for the order management system showing that the order may be tracked 1003 to provide current order status information to a user.

Figure 11:
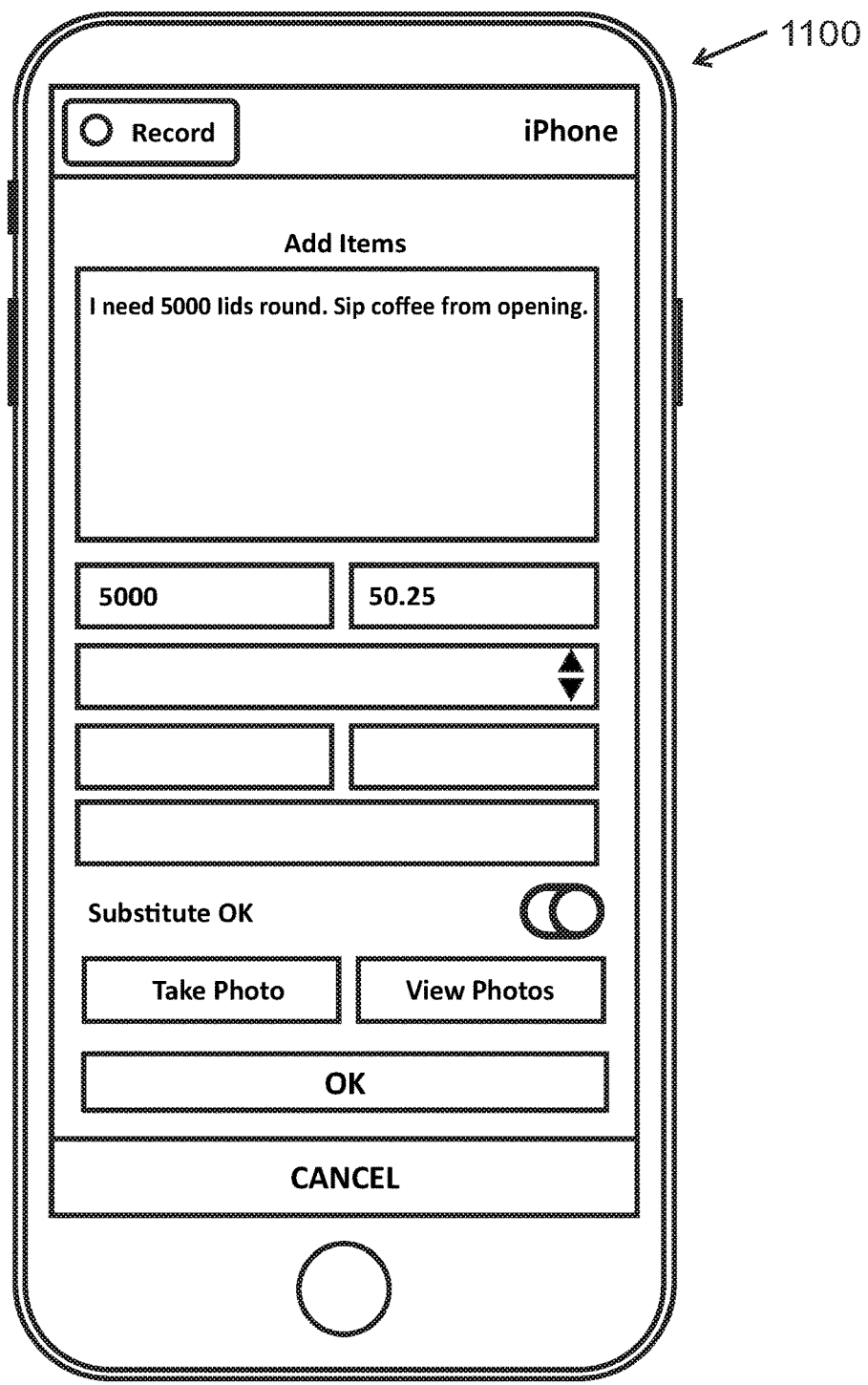
FIG. 11 is a smartphone-user screen special sales quote request display for the order management system.
Figure 12:
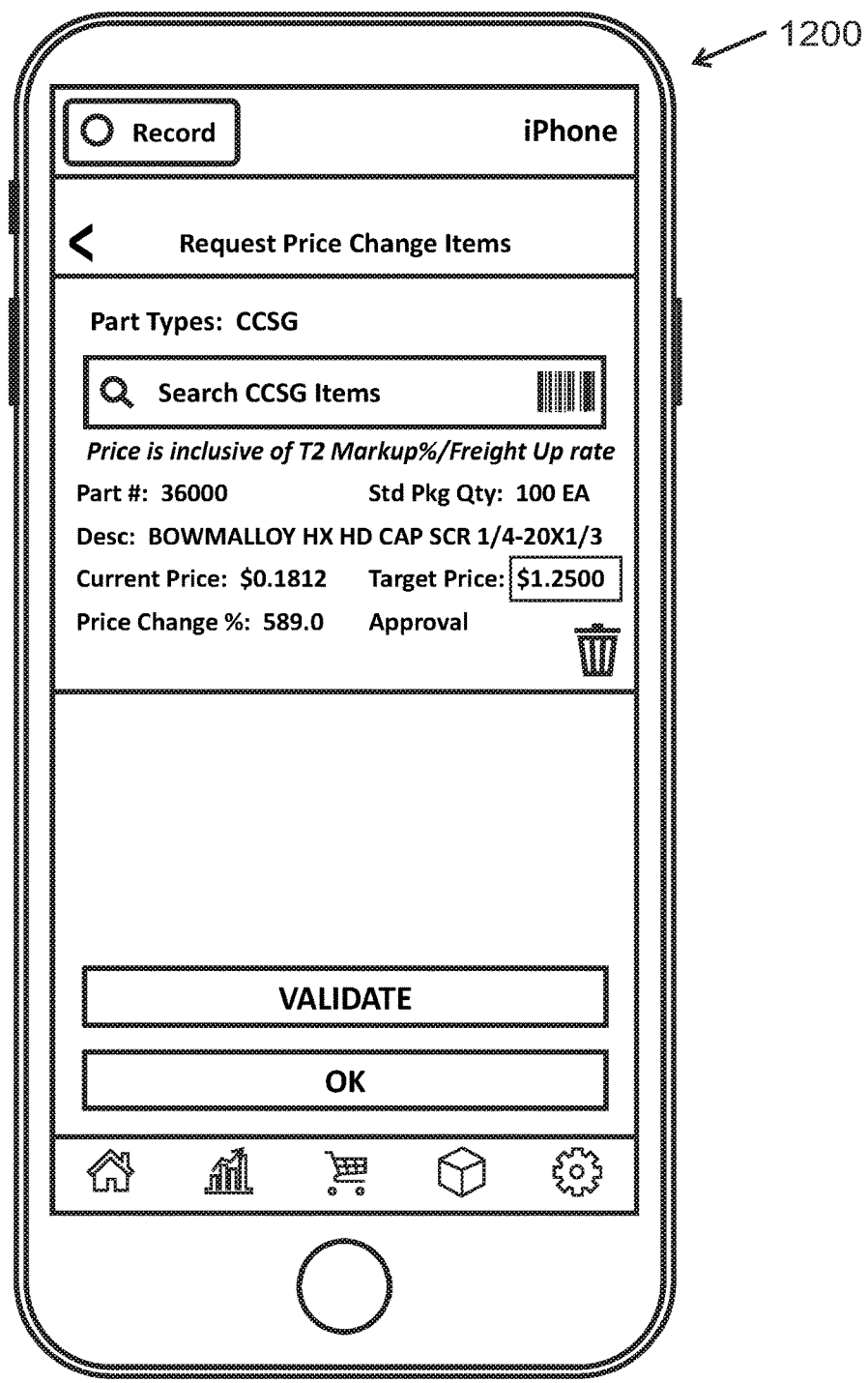
FIG. 12 is a smartphone-user screen price change request display for the order management system.

Other functionality includes, for example, the ability to request a special sales quote. FIG. 11 is a smartphone-user screen special sales quote request display 1100 for the order management system. Price change requests may also be entered by the user (a salesperson). FIG. 12 is a smartphone-user screen price change request display 1200 for the order management system.

It is, therefore, apparent that there has been provided, in accordance with the various objects of the present invention, a Network Based Vendor-Managed Inventory System And Method.

While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and drawings appended herein.

What is claimed is:

1. A network based vendor-managed inventory system, comprising:
   a portable barcode scanner configured to output data according to at least one of an HID, CDC, Honeywell API or SPP protocol, the output data reflecting results of scanning a barcode;
   a smartphone device, physically removed from the portable barcode scanner, having an input port through which an external device can provide data to the smartphone device for processing, the smartphone device being incapable of recognizing and parsing data, received via the input port, when the data is configured according to the HID, CDC Honeywell API or SPP protocol;
   a communication connection connecting the smartphone device and the portable barcode scanner to each other via the input port;
   a scanner adapter application, operating on the smartphone device, which receives the output data from the portable barcode scanner via the input port, the output data comprising order data relating to a supply item stocked in a bin and configured according to one of the HID, CDC, Honeywell API or SPP protocols, the scanner adapter application being configured to parse the order data; an upload application operating on the smartphone device, the upload application having a current data field that receives at least part of the order data;
   an API configured to receive order information including the at least part of the order data, from the upload application on the smartphone device, receive and compile the order information as at least one order batch whereas each order batch is a data structure comprising scanned barcodes, convert the at least one order batch into an electronic supply order, store the at least one order batch in a data repository associated with the API, and send the electronic supply order to a vendor server;

the API further being configured to automatically create an electronic supply order for one or more batches containing scanned barcodes on the vendor server;

an interface through which the smartphone device can connect to a backend server via a network;

the backend server configured to retain ordering data, update ordering data, and provide sales metrics to an order management application operating on the smartphone device; and an order management application, operating on the smartphone device, which uses the ordering data from the scanner adapter application to access the backend server and complete an order.

2. The network based vendor-managed inventory system of claim 1, further comprising a backend access application operating on the smartphone which takes information from the backend server and provides it to the smartphone device.

3. The network based vendor-managed inventory system of claim 2, wherein the backend access application and the order management application have a common graphical user interface displayed on the smartphone device.

4. The network based vendor-managed inventory system of claim 1, wherein the ordering data of the backend server comprises quantity available information and item detail information.

5. The network based vendor-managed inventory system of claim 1, wherein the ordering data of the backend server comprises customer detail information.

6. The network based vendor-managed inventory system of claim 1, wherein the electronic order is entered using a graphical user interface of the smartphone.

7. The network based vendor-managed inventory system of claim 1, wherein the API is further configured to cross reference pricing information on the vendor server against pricing information on competitor vendor servers to determine a best price for the electronic order and to provide the determined best price to the smartphone.

8. The network based vendor-managed inventory system of claim 1, wherein the API is configured for direct access between a smartphone and the backend server.

9. A network based vendor-managed inventory system, comprising:
   a portable barcode scanner configured to output data, the output data reflecting results of scanning a barcode;
   a smartphone device, physically removed from the portable barcode scanner, and having an input port through which an external device can provide data to the smartphone device for processing, the smartphone device being incapable of recognizing and parsing data, received via the input port;
   a communication connection connecting the smartphone device and the portable barcode scanner to each other via the input port;
   a scanner adapter application, operating on the smartphone device, which receives the output data from the portable barcode scanner via the input port, the output data comprising order data relating to a supply item stocked in a bin, the scanner adapter application being configured to parse the order data and pass the order data to an upload application operating on the smartphone device, the upload application having a current data field that receives at least part of the order data, the upload application being further configured to upload order information with an API, via a network, the order information including the at least part of the order data via an interface of the smartphone device;
   wherein the API is configured to automatically create an electronic supply order for one or more batches containing scanned barcodes on the vendor server; and
   wherein the API is further configured to receive order information including the at least part of the order data, from the upload application on the smartphone device, receive and compile the order information as at least one order batch whereas each order batch is a data structure containing scanned barcodes, convert the at least one order batch into an electronic supply order, store the at least one order batch in a data repository associated with the API, and send the electronic supply order to a vendor server;
   a backend server configured to retain ordering data, update ordering data, and provide sales metrics to an order management application operating on the smartphone device;
   a backend access application, operating on the smartphone device, which takes information from the backend server and provides it to the smartphone device; and
   an order management application, operating on the smartphone device, which uses the ordering data from the scanner adapter application to access the backend server and complete an order.

10. The network based vendor-managed inventory system of claim 9, wherein the backend access application and the order management application have a common graphical user interface displayed on the smartphone device.

11. The network based vendor-managed inventory system of claim 9, wherein the ordering data of the backend server comprises quantity available information and item detail information.

12. The network based vendor-managed inventory system of claim 9, wherein the ordering data of the backend server comprises customer detail information.

13. The network based vendor-managed inventory system of claim 9, wherein the electronic order is entered using a graphical user interface of the smartphone.

14. The network based vendor-managed inventory system of claim 9, wherein the API is further configured to cross reference pricing information on the vendor server against pricing information on competitor vendor servers to determine a best price for the electronic order and to provide the determined best price to the smartphone.

15. The network based vendor-managed inventory system of claim 9, wherein the API is configured for direct access between a smartphone and the backend server.

16. A computer-implemented method for ordering of supplies, comprising:
    scanning, using a portable scanner, at least one item barcode on a bin, the item barcode being associated with a supply item stocked within the bin;
    transmitting order information data from the portable scanner to a smartphone device remotely located from the scanner, the order information data being configured according to an HID, CDC, Honeywell API or SPP protocol and corresponding to the item barcode;
    receiving in an adapter application operating on the smartphone device, the order information from the portable scanner;

parsing the order information data using the adapter application and transferring the order information data into a data field of an upload application operating on the smartphone device;

providing ordering data from a backend server to the smartphone using a backend access application operating on the smartphone;

creating an order on the smartphone using an order management application operating on the smartphone;

transmitting, using the upload application, the order information data with an API;

processing, using the API, the received order information into an electronic order; and transmitting the electronic order to a vendor server.

17. The computer-implemented method for ordering of supplies as recited in claim 16, further comprising, using the API, cross referencing pricing information on the vendor server against pricing information on competitor vendor servers to determine a best price for the electronic order and providing the determined best price to the smartphone device.

18. The computer-implemented method for ordering of supplies as recited in claim 16, further comprising the step of selecting an account on the smartphone device.

19. The computer-implemented method for ordering of supplies as recited in claim 16, further comprising the step of receiving the status of an order on the smartphone device.

20. The computer-implemented method for ordering of supplies as recited in claim 16, further comprising the step of receiving quantity available information on the smartphone device before creating an order on the smartphone device.

21. The computer-implemented method for ordering of supplies as recited in claim 16, further comprising the step of requesting a price change on the smartphone device.

22. The computer-implemented method for ordering of supplies as recited in claim 16, further comprising the step of providing alternative product information to the smartphone device.

23. The computer-implemented method for ordering of supplies as recited in claim 16, further comprising the step of generating customer usage reports.

24. The computer-implemented method for ordering of supplies as recited in claim 16, further comprising the step of requesting that a barcode label be printed.

25. The computer-implemented method for ordering of supplies as recited in claim 16, further comprising the step of preparing a special sales quote.

\* \* \* \* \*